US005827150A

United States Patent [19]

Mukumoto

[11] Patent Number: 5,827,150

[45] Date of Patent: Oct. 27, 1998

[54] ENGINE CONTROL HAVING SHIFT ASSIST WITH FUEL INJECTED DURING IGNITION CUTOFF WHILE SHIFTING

[75] Inventor: Kyoji Mukumoto, Hamamatsu, Japan

[73] Assignee: Yamaha Hatsudoki Kabushiki Kaisha, Iwata, Japan

[21] Appl. No.: 681,164

[22] Filed: Jul. 22, 1996

[30] Foreign Application Priority Data

Jul. 27, 1995 [JP] Japan .................................... 7-191347

[51] Int. Cl.[6] ............................... F02N 9/00; F16H 59/68

[52] U.S. Cl. .............................. 477/101; 477/109; 440/1; 440/84; 123/331

[58] Field of Search .............................. 477/98, 101, 106, 477/906, 109; 440/1, 84; 123/330, 331, 413

[56] References Cited

U.S. PATENT DOCUMENTS 4,726,798 2/1988 Davis ...................................... 477/101
4,843,914 7/1989 Koike ...................................... 477/109
4,966,115 10/1990 Ito et al. ............................ 477/906 X
5,072,629 12/1991 Hirukawa et al. ...................... 477/101
5,403,246 4/1995 Umemoto ................................ 477/101
5,579,736 12/1996 Nakamura et al. ................ 123/339.11
5,665,025 9/1997 Katoh ...................................... 477/101

FOREIGN PATENT DOCUMENTS 4-12139 1/1992 Japan .................................... 477/101

*Primary Examiner*—Khoi Q. Ta
*Attorney, Agent, or Firm*—Knobbe, Martens, Olson & Bear LLP

[57] ABSTRACT

A marine propulsion engine control system wherein the control includes an arrangement for slowing the speed of the engine by disabling certain cylinders in the event of an abnormal engine running condition. Also, an arrangement is provided for slowing the speed of the engine if a change speed transmission for driving the propulsion shaft by the engine offers more than a predetermined resistance to shifting. The controls are interrelated so that the engine protection control predominates. That is, if the engine is in protection control mode and the operator attempts a shift and more than a predetermined resistance is felt, the shift control routine will not be initiated to effect any additional engine speed reduction. In addition, when the engine speed is reduced, fuel is continued to be supplied by the fuel injectors to avoid backfiring, stalling, and uneven running. When rapid deceleration is called for the spark advance is rapidly retarded but fuel injection amount is gradually decreased.

22 Claims, 15 Drawing Sheets

ENGINE CONTROL HAVING SHIFT ASSIST WITH FUEL INJECTED DURING IGNITION CUTOFF WHILE SHIFTING

BACKGROUND OF THE INVENTION

This invention relates to an improved engine control system and method and more particularly to an improved control system and method for engines particularly those that drive transmissions and which incorporate shift assists therefore.

In many forms of marine propulsion systems, the powering internal combustion engine drives a propulsion device through a transmission. Conventionally, the transmissions utilized for this purpose are forward, neutral, reverse transmissions of the bevel gear type and which are shifted by means of dog clutches. These transmissions have the advantage of being able to transmit large amounts of power while maintaining a relatively small and compact assembly. However, this type of transmission has problems in that the engagement of the dog clutches can be difficult at times. This is particularly true if the engine is running at a high speed or developing a large amount of power at the time the shift is attempted.

It has, therefore, been the practice to provide a variety of shift assisting mechanisms which will automatically reduce the speed of the engine when high shifting forces are encountered. This is normally done by discontinuing the firing of the spark plugs and/or the reduction of fuel supply to the engine. Of course, when the engine is operated with a carburetor, the reduction of the engine speed will automatically reduce the amount of fuel flow to the engine. However, this has certain disadvantages. Primarily, the cutting of the ignition and also the abrupt discontinuance or reduction of fuel flow can cause backfiring.

It is, therefore, a principal object of this invention to provide an improved shift control system and method for a marine propulsion system.

It is a further object of this invention to provide an improved shift control system and method for a marine propulsion system wherein the engine is spark ignited and employs fuel injection.

In addition to reducing the engine speed for assisting in shifting, many marine propulsion system employ protection systems for protecting the engine from damage in the event of abnormal conditions. These systems reduce the speed of the engine generally by misfiring the spark plugs so as to permit the engine to operate in a safe mode without leaving the operator stranded at sea. In other words, the engine is operated in what is called a “limp home mode” wherein the engine will be operated at a speed low enough that it will not be damaged, but which will not strand the operator.

Obviously, many engine control systems include both the speed reduction systems for engine protection and also speed reduction systems for shift assists. Frequently, the control strategy for the two methods of speed reduction are not the same.

Therefore, there may occur a situation wherein the engine speed has been reduced due to a dangerous condition and the operator attempts to shift the transmission into a different drive mode in order to return to shore. If the shift assist disabling is superimposed on the engine protection disabling, the engine may stall. This can be quite significant because it may then be difficult to restart the engine.

It is, therefore, a still further object of this invention to provide an improved engine protection and shift assist system wherein in the event of engine protection, the shift assist system is disabled so as to ensure against engine stalling.

In engine control systems there are also systems where the arrangement embodies a mechanism so as to facilitate a rapid deceleration of the engine. Generally, these systems operate so that when the operator releases or returns the throttle to a lower speed condition at a high rate of speed, the ignition timing is also retarded rapidly so as to permit a rapid speed reduction. If this occurs, however, like the disabling mode, there may be backfiring occurring.

It is, therefore, a still further object of this invention to provide an improved engine control system and method that facilitates rapid engine slow-down without adverse affects

SUMMARY OF THE INVENTION

A first feature of this invention is adapted to be embodied in a marine propulsion control system and method. The propulsion system includes a spark-ignited internal combustion engine having a plurality of cylinders. A plurality of fuel injectors are also provided or supplying fuel to the cylinders. A control system controls the timing and duration of injection by the fuel injectors and the timing of firing of the spark plugs in response to engine running conditions. The engine drives a propulsion devise through a change speed transmission. A shift control is provided for shifting the condition of the change speed transmission. Means are provided for sensing the pressure applied by an operator to the shift control for determining the resistance to shifting.

In accordance with a system for practicing the invention, the control for the firing of the spark plugs reduces the speed of the engine by misfiring the spark plugs in the event a more than a predetermined force is sensed for effecting the shift. When the speed of the engine is reduced by misfiring the spark plugs, the control continues to inject fuel from all of the fuel injectors.

In accordance with a method for practicing the invention, if more than a predetermined shifting force is determined, the engine speed is reduced by misfiring the spark plugs. However, the amount of fuel injected by the fuel injectors is maintained when the spark plugs are misfired.

Another feature of the invention is also adapted to be embodied in an engine control for a marine propulsion engine having a plurality of cylinders each having at least one spark plug for firing a charge therein. Fuel injectors are provided for supplying fuel to the engine’s cylinders. A control controls the timing and during of fuel injection and the timing of firing of the spark plugs in response to sensed engine conditions. The engine drives a propulsion device through a change speed transmission which is operated by a shift control. Means are provided for sensing an abnormal engine running condition. Means are also provided for sensing when the force applied to the shift control exceeds a predetermined value.

In accordance with a system for practicing the invention, if the engine abnormal condition is sensed, the speed of the engine is reduced by misfiring the spark plugs. If more than the predetermined force is applied the transmission control, however, no further speed reduction is initiated.

In accordance with a method of practicing this feature of the invention, if an abnormal engine condition is sensed, the speed of the engine is reduced by misfiring the spark plugs. If, however, at the same time or subsequently a transmission shift is attempted and more than a predetermined force is encountered, further engine speed reduction is not initiated.

Still further features of the invention are adapted to be embodied in an engine control for an internal combustion engine having a spark ignition system for controlling the timing of firing of at least one spark plug and a fuel injector for injecting fuel into the engine cylinder ignited by the spark plug. An operator control is provided for controlling the speed of the engine in response to operator demand. Both the spark timing and fuel injection amount are controlled in response to the position of the operator control.

In accordance with a system for practicing this feature of the invention, if the operator control calls for a rapid reduction of engine speed, the spark timing is retarded rapidly but the fuel injection amount is decreased gradually.

In accordance with a method for practicing this facet of the invention, it the operator calls for a rapid speed reduction, the spark timing is rapidly retarded and the fuel injection amount is gradually reduced.

DETAILED DESCRIPTION OF THE PREFERRED EMBODIMENTS OF THE INVENTION

Figure 1:
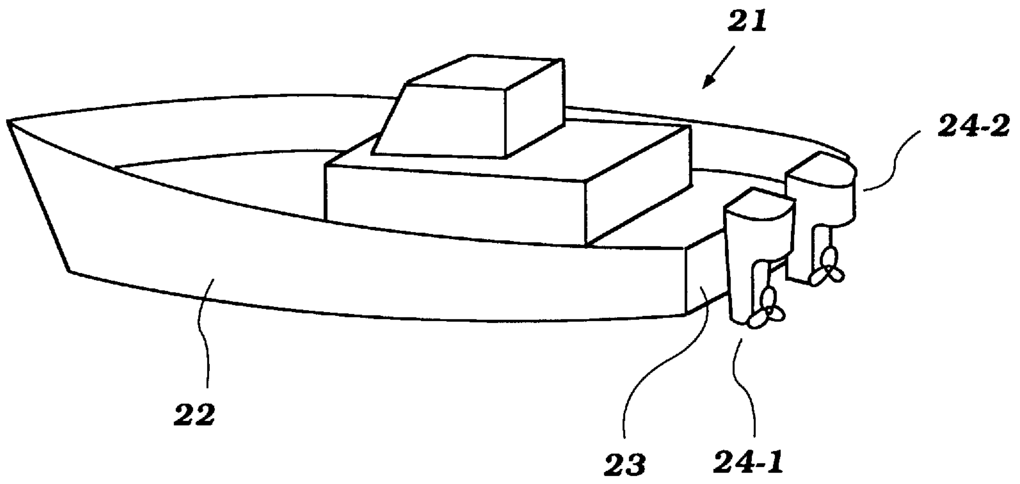
FIG. 1 is a rear, side perspective view of a watercraft powered by a propulsion system constructed and operated in accordance with an embodiment of the invention.

Referring now in detail to the drawings and initially to FIG. 1, a watercraft constructed and propelled by a propulsion system that is operated and constructed in accordance with an embodiment of the invention is identified generally by the reference numeral 21. Although the invention is described in conjunction with a watercraft such as the watercraft 21, it will be readily apparent to those skilled in the art from the following description, as well as from the foregoing remarks, that the invention is directed primarily to the control for the propulsion system of the watercraft 21.

For this reason and since the control system is not limited to any particular engine or engine type or use for the engine, an application to a watercraft, such as the watercraft 21, is utilized only to enable to those skilled in the art to understand how the invention can be utilized. Those skilled in the art will readily understand how the invention can be utilized in conjunction with any of a wide variety of types of internal combustion engines as well as loads operated by those engines.

To continue, the watercraft 21 includes a hull 22 which has a transom 23 upon which a pair of outboard motor propulsion devices 24-1 and 24-2 are mounted. The invention is described in conjunction with an application embodying dual propulsion devices because, as will become apparent, certain facets of the invention have utility in conjunction with arrangements wherein there are such dual propulsion devices. For the foregoing reasons, however, those skilled in the art will readily understand how the invention can be employed with engine applications utilizing only one engine.

Figure 2:
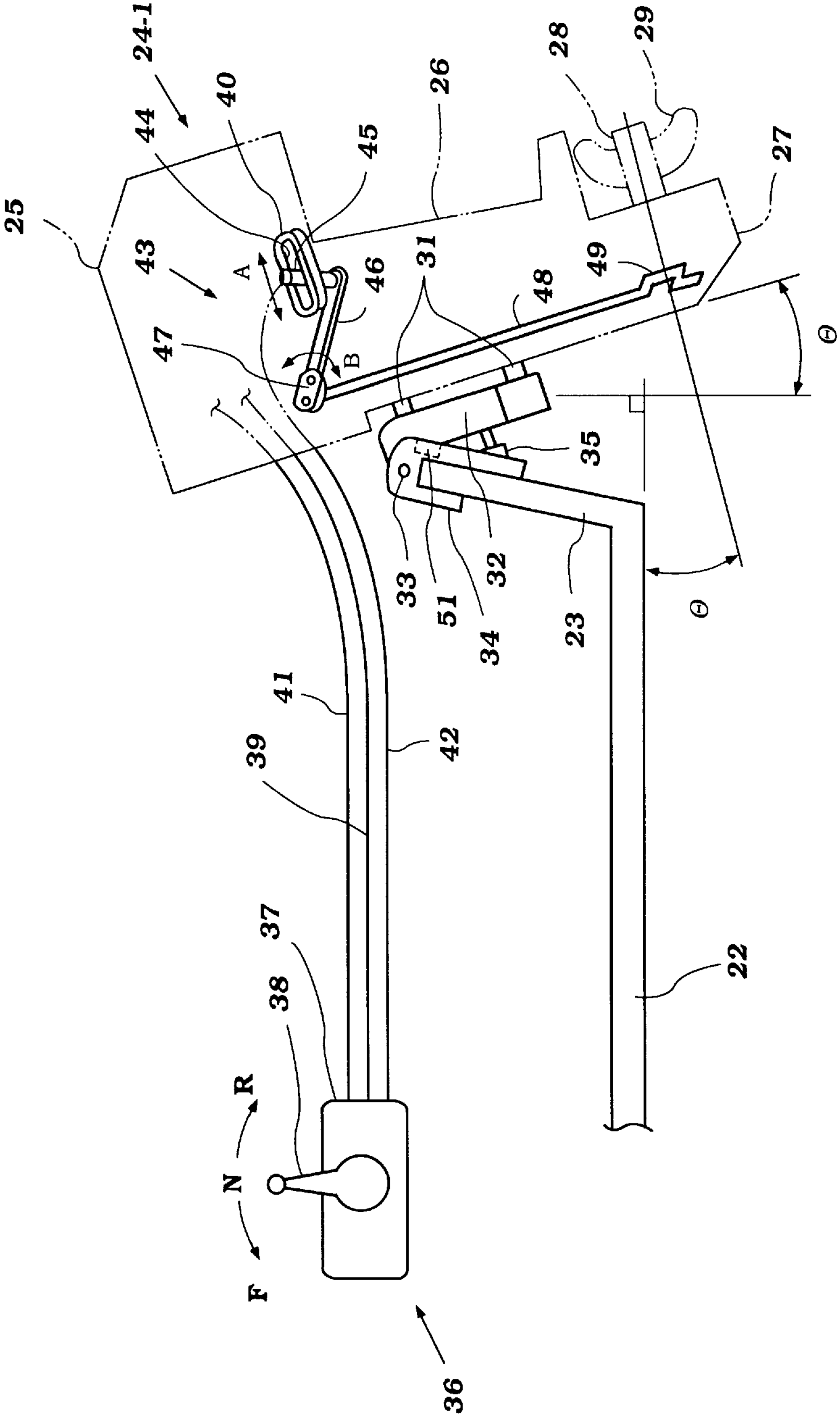
FIG. 2 is a side elevational view of a portion of the watercraft and specifically of one of the propulsion devices and its operator controls.

As has been noted, the propulsion devices 24-1 and 24-2 are outboard motors and these motors are shown in more detail in FIG. 2 wherein their attachment to the transom 23 of the watercraft 22 is also shown in more detail. Each outboard motor includes a powerhead, shown in phantom and indicated by the reference numeral 25. This powerhead contains a powering internal combustion engine which, as previously noted, may be of any known type or configuration. In the exemplary embodiment that will be described, this engine is of the V-6, two-cycle, crankcase compression type. For the reasons already noted, the invention can be utilized with a wide variety of types of engines other than that specifically described.

As is typical with outboard motor practice, the engine in the powerhead 25 is mounted so that its output shaft or crankshaft rotates about a vertically extending axis. This facilitates connection to a drive shaft (shown later in FIG. 4) that depends into and is rotatably journaled in a drive shaft housing 26.

This drive shaft continues on to a lower unit 27 in which a forward neutral reverse transmission of a known, bevel gear type, is positioned. This transmission drives a propeller hub 28 from which propeller blades 29 extend in a known manner and one which will be described later in more detail by reference to FIG. 4. In applications employing dual outboard motors as described, each propeller 29 preferably rotates in a direction opposite to the other during both the forward and reverse drive modes.

Each outboard motor has a steering shaft affixed, as by brackets 31, to its drive shaft housing 26 in a known manner. These steering shafts are journaled for rotational movement about a vertically extending steering axis in a respective swivel bracket 32. The swivel bracket 32 is, in turn, pivotally connected by means of a pivot pin 33 to a clamping bracket 34. The pivotal connection provided by the pivot pin 33 permits tilt and trim movement of the outboard motors 24 as is well known in this art.

A hydraulic motor and shock absorbing assembly, indicated generally by the reference numeral 35, is interposed between the transom 23 of the watercraft and the outboard motors 24 for accomplishing controlled tilt and trim movement. These hydraulic motors 35 also may include shock absorbing mechanisms which permit the outboard motors 24 to pop when underwater obstacles are struck.

The clamping brackets 34 incorporate clamping mechanisms for attaching them to the transom 23 of the hull 22 in a well known manner.

As has been noted, the outboard motors 24 include a transmission which permits shifting between a forward, neutral and reverse position which will be described in more detail later by reference to FIG. 4. In addition, the engine of the powerhead 25 is provided with some form of engine speed control which may constitute one or more throttle valves (as will be described by reference to FIG. 3) of the engine.

As is typical with marine practice, a single lever control, indicated generally by the reference numeral 36 may be mounted in the hull 22 at a position convenient to the operator and spaced from the transom 23. The single lever control 36 includes a base assembly 37 and an operator-controlled lever 38. The lever 38 is connected by a first set of bowden wire actuators 39 and 41 to the engine speed control. In addition, a connection is provided by a bowden wire actuator 42 to a transmission shift control, shown in part in perspective view in this figure and indicated generally by the reference numeral 43.

As those skilled in this art will readily understand, the single lever control 38 is movable between a neutral position indicated at N to a forward drive position F or a reverse drive position R. Generally, the way the system operates is that the single control lever 38 is movable through a first range from its neutral position to either the forward or reverse drive positions wherein the transmission, operated through the linkage system which will be described, moves from its neutral to its forward or reverse drive positions. After engagement of the clutches of the transmission has occurred, continued movement of the lever 38 will cause the throttle or engine speed controls to continue to open to permit increase in the engine's speed.

Although the throttle control is not shown in detail because it is conventional, a portion of the transmission control is shown although that also is conventional. This transmission control includes a control lever 40 which is pivotally supported within the powerhead 25 and which defines a cam groove 44 in which a follower pin 45 is received. The follower pin 45 is mounted at one end of a shift control lever 46 which is connected by a coupling 47 to a shift control rod 48. The shift control rod 48 has a crank arm 49 at its lower end that cooperates with a suitable mechanism as will be described for effecting the operation of the transmission in the lower unit 27. Again, this mechanism is generally of the type known in the art and, will be described later in more detail by reference to FIG. 4.

Figure 3:
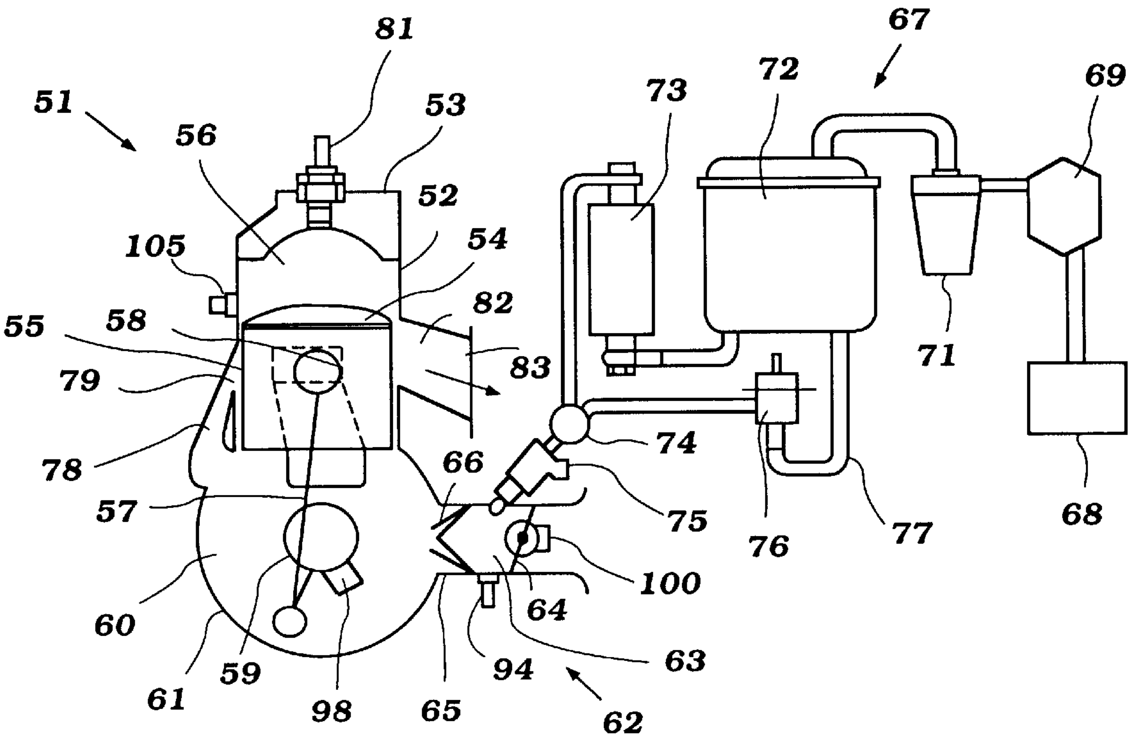
FIG. 3 is a partially schematic, cross sectional view of the engine of the one propulsion units taken through one of its cylinders and showing the fuel supply system in part.

Referring now primarily to FIG. 3, a portion of the engine of the powerhead 25 is depicted and is identified generally by the reference numeral 51. The engine 51, as has been previously noted, is in a preferred embodiment a two-cycle engine having a V-6 configuration. Such engines are normally used as propulsion units in outboard motors and for this reason a two-cycle engine of this configuration is described. In fact, however, FIG. 3 only shows a single cylinder of the engine but it will be readily apparent to those skilled in the art how the invention can be practiced with engines having other cylinder numbers and other cylinder configurations. Also, although the invention is described in conjunction with a two-cycle engine, it should be apparent to those skilled in the art that the invention can also be utilized with four-cycle engines.

It should also be recognized that the following description of the engine 51 is only to permit those skilled in the art to understand the general environment in which the invention can be utilized. Therefore, where any details of the engine 51 or its supporting components are either not illustrated or are illustrated only schematically, reference may be had to any construction known in the art.

The engine 51 includes a cylinder block 52 having cylinder banks each of which is closed by a cylinder head 53 that is affixed thereto in a known manner. A piston 54 reciprocates in a cylinder bore 55 of the cylinder block and defines with the cylinder bore 55 and the cylinder head 53 a combustion chamber 56. The piston 54 is connected to the small end of a connecting rod 57 by means of a piston pin 58. The big end of the connecting rod 56 is journaled on a throw of a crankshaft 59.

The crankshaft 59 is journaled for rotation in a crankcase chamber 60 that is formed by the cylinder block 52 and more specifically by a skirt thereof and a crankcase member 61 that is affixed to the cylinder block skirt in a known manner. As has been noted and as is typical with outboard motor practice, the engine 51 is mounted so that the rotation axis of the crankshaft 59 is in a vertical orientation.

Since the engine 51 in the described embodiment operates on a two-cycle crankcase compression principle, the crankcase chambers 60 associated with each of the cylinder bores 55 are sealed from each other in a known manner.

An air induction system, indicated generally by the reference numeral 62 is provided for delivering an air charge to the combustion chambers 56 through the crankcase chambers 60. This induction system includes an air inlet device that draws atmospheric air from within the protective cowling of the powerhead in a well known manner.

This air is then delivered to a throttle body 63 in which a throttle valve 64 is rotatably journaled. This air then flows to intake ports 65 formed in the crankcase chamber 60. Reed-type check valves 66 are provided in these intake ports 65 so as to permit a charge to flow into the crankcase chambers 60 but which act to prevent reverse flow when the pistons 54 are moving downwardly to compress the charge in the crankcase chambers 59.

Fuel is mixed with the air in the throttle body 63 and is supplied by a fuel supply system, indicated generally by the reference numeral 67. This fuel supply system 67 includes a fuel tank 68 which is mounted in the hull 22 of the watercraft. A low-pressure pump 69, which may be driven by the engine 51 in a known manner, draws fuel from this remote tank 68 through a suitable conduit and passes it through a filter 71. The fuel then enters a fuel vapor separator 72 which functions to remove fuel vapors and air from the fuel so as to prevent vapor lock and intermittent fuel injection.

A high pressure pump 73 draws fuel from the fuel vapor separator 72 and delivers it to a fuel rail 74. Although the fuel pump 73 is shown in a separate location, in actual practice the high-pressure fuel pump 73 may be actually contained within the body of the fuel vapor separator 72.

The fuel rail 74 supplies fuel to a plurality of fuel injectors 75, one for each combustion chamber of the engine. The fuel injectors 75 are mounted preferably in the throttle body 63 and spray fuel downstream of the throttle valve 64 toward the reed-type check valve 66.

Fuel is maintained at the desired pressure in the fuel rail 74 by a pressure regulator 76. The pressure regulator 76 maintains the desired pressure by dumping excess fuel back to the fuel supply system, for example, to the vapor separator 72 through a return conduit 77.

The fuel and air which is thus delivered to the crankcase chambers 60 is then transferred to the combustion chambers 56 through one or more scavenge passages 78 that extend from the crankcase chambers 60 to the cylinder bores 55 where they end in scavenge ports 79. This charge is then further compressed in the combustion chamber 56. At an appropriate time interval, as will be described, this charge is ignited by one of a plurality of spark plugs 81 that are mounted in the cylinder head 53 and each of which has its gap disposed in a respective one of the combustion chambers 56.

The charge burns and expands and then eventually opens an exhaust port 82 formed in the cylinder bore 55 and which communicates with an exhaust system shown partially and schematically and indicated by the reference numeral 83. As is typical with outboard motor practice, this exhaust system may discharge under high-speed/high-load conditions through an underwater exhaust gas discharge which may be formed in the hub 28 of the propeller 29. In addition, an above-the-water, more restricted low-speed exhaust gas discharge may also be provided, as is well known in this art.

The high-speed underwater exhaust gas discharge and transmission by which the propeller 29 is illustrated and will be described by reference to FIG. 4. As may be seen, the lower unit 27 rotatably journals a propeller shaft 84 to which the hub 28 of the propeller 29 is affixed in a known manner. Hence, the hub 28 is partially hollow so that the exhaust gases may flow through the path indicated by the arrows C and D in this figure.

This figure illustrates the coupling of the engine crankshaft to the aforenoted but previously unillustrated drive shaft 85. The drive shaft 85 has a driving bevel gear 86 affixed to its lower end. This bevel gear 86 meshes with a pair of diametrically opposed, driven bevel gears 87 and 88 which are journaled in an appropriate manner for rotation relative to the propeller shaft 84. Because of their diametrically opposite positions, the bevel gears 87 and 88 will rotate in opposite directions with the bevel gear 87 being the forward drive gear and the bevel gear 88 being the reverse drive gear.

A dog clutching element 89 has a splined connection to the propeller shaft 84 and has dog clutching teeth that can be engaged with corresponding teeth on the bevel gears 87 and 88 so as to select either forward or reverse rotation of the propeller shaft 84 and propeller 29, as is well known in this art.

The dog clutching element 89 is shifted by a shift plunger 91 that has a cam groove that receives the crank arm 49 of the shift control rod 48. This shift plunger is connected for axial movement with a shift element 92, which shift element rotates with the propeller shaft 84 and is coupled to the dog clutching element 89 through a coupling pin 93. Thus, by moving the clutch plunger 91 between the forward and reverse positions as shown in FIG. 4, forward or reverse drive of the propeller 29 may be effected. The neutral condition is shown in FIG. 4, wherein neither forward nor reverse drive of the propeller 29 is accomplished.

Since the back pressure on the engine can affect the engine performance, the outboard motor 24 is provided with a trim angle sensor, indicated schematically by the reference numeral 95 which measures the angle θ between the steering shaft and a vertical as shown in FIG. 2. This angular measurement by the trim angle sensor 95 is utilized in engine control, as will be described.

In connection with the basic engine control, there are certain types of sensors which may be incorporated and, although the engine is not shown in detail, those skilled in the art will readily understand the type of sensors which are described and those which are available in the art and which may be utilized to practice the invention. In addition to the trim sensor 95 described, additional sensors may be employed.

This basic engine control will now be described by primary reference to FIGS. 3 and 5 wherein the various sensors are shown in a schematic fashion. Even though the showing and description is schematic, those skilled in the art will readily understand how to practice the invention in conjunction with actual physical embodiments.

The control includes an ECU 96 controls a capacitor discharge ignition circuit and the firing of spark plugs 81. The spark plugs 81 and other components of the system which are associated with a particular cylinder of the engine have their reference characters noted with a suffix showing the specific cylinder number.

In addition, the ECU controls the engine fuel injectors 75 so as to control both the beginning and duration of fuel injection and the regulated fuel pressure, as already noted. The ECU 96 operates on a strategy for the spark control and fuel injection control as will be described. This system employs an exhaust sensor assembly indicated generally by the reference numeral 97. This sensor is preferably an oxygen ($O_2$) sensor of any known type.

The sensors employed further include a crankshaft position sensor 98 which senses the angular position of the engine crankshaft and also the speed of its rotation. A crankcase pressure sensor may also provided for sensing the pressure in the individual crankcase chambers. Among other things, this crankcase pressure signal may be employed as a means for measuring intake air flow and, accordingly, controlling the amount of fuel injected by the injectors 75, as well as their timing.

An air temperature sensor 99 may be provided in the intake passage downstream of the engine throttle valves 64 for sensing the temperature of the intake air. In addition, the position of the throttle valves is sensed by a throttle position sensor 100.

In accordance with some portions of the control strategy, it may also be desirable to be able to sense the condition of the described transmission for driving the propeller 29 or at least when it is shifted into or out of neutral. Thus, a transmission condition sensor 101 is mounted in the powerhead and cooperates with the shift control mechanism for providing the appropriate indication.

As noted, the trim angle sensor 95 is provided for sensing the angular position of the swivel bracket 32 relative to the clamping bracket 34. This signal can be utilized to determine the exhaust back pressure.

Figure 5:
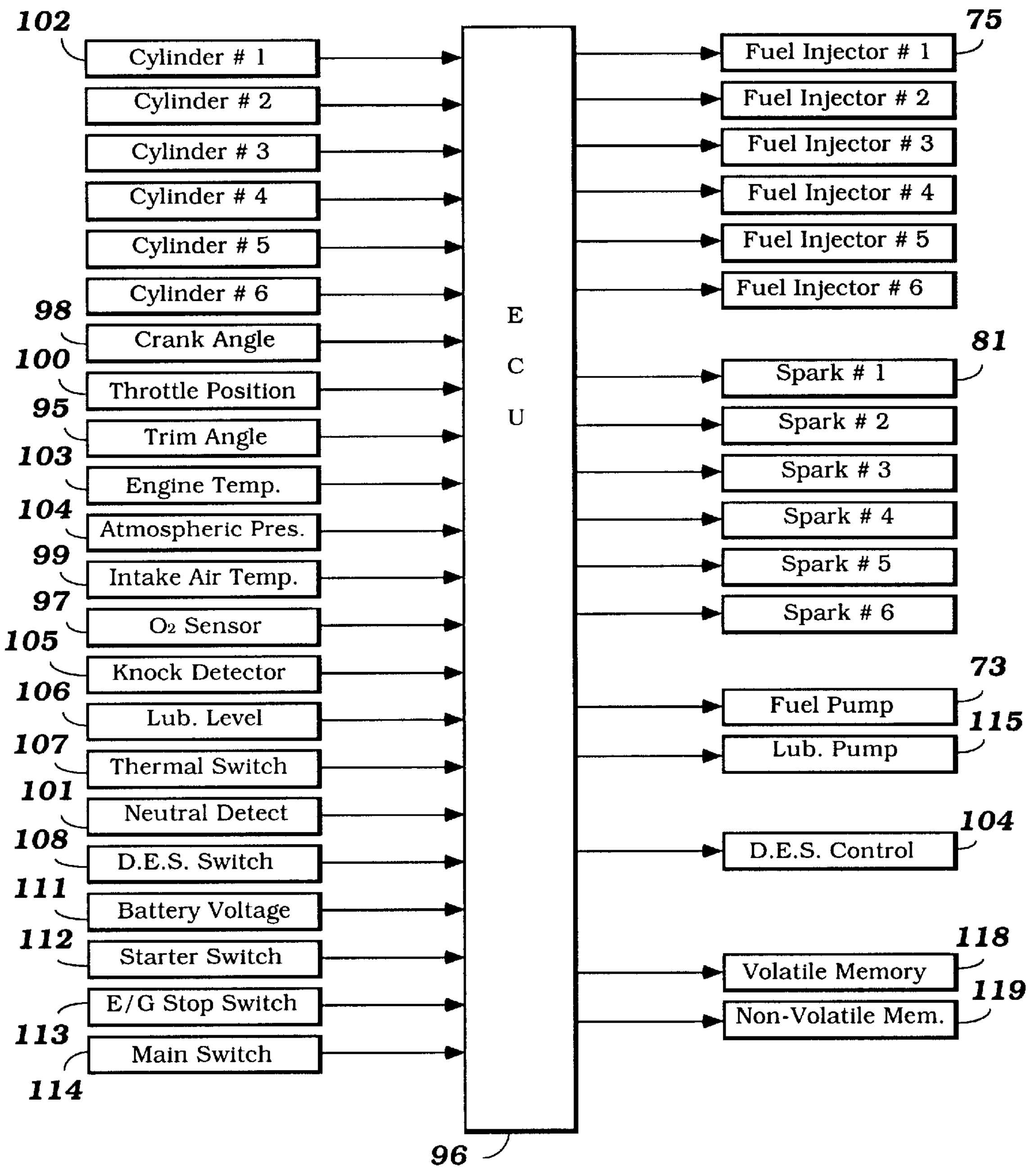
FIG. 5 is a diagrammatic view showing the relationship of the various detectors of the propulsion unit controls to the ECU and the relationship of the ECU to certain controlled portions of the engine, specifically the fuel injectors, ignition system, fuel pump, and oil pump.

Continuing to refer primarily to FIG. 5, this shows the ECU 96 and its input and output signals which includes the output signals to the fuel injectors 75 and the spark plugs 81 for controlling the time of beginning of injection of each of the fuel injectors 75, the duration of injection thereof and also the timing of firing of the spark plugs 81. Certain of the detectors for the engine control have already been described and these include the oxygen sensor 97, the crank angle sensor 98, the intake air temperature sensor 99, the throttle position detector 100, the transmission neutral detector switch 101 and the trim angle sensor 96. In addition, each cylinder is provided with a respective detector 102 which is associated with the crankshaft and indicates when the respective cylinder is in a specific crank angle. This may be such a position as bottom dead center (BDC) or top dead center (TDC). These sensors cooperate along with the basic crank angle position sensor 98 and provide indications when the respective cylinders are in certain positions, as noted.

There is also provided an engine temperature sensor 103 which is mounted in an appropriate body of the engine and which senses its temperature. As will become apparent, the output of the engine temperature sensor 103 may be utilized also to detect when the engine is in an over-heat mode and initiate protective action so as to permit the engine to continue to operate, but restrict its speed if an over-temperature condition exists. This speed limitation may be accomplished by disabling the operation of one or more of the engine cylinders. As will also become apparent, the actual cylinder which is disabled may be changed during this protective running mode so that all cylinders will fire at least some times, but certain cylinders will be skipped during one or more cycles. This will ensure against plug fowling, etc. during this protective mode.

There is also provided an atmospheric air pressure detector 104 that provides a signal indicative of atmospheric air pressure for engine control.

The engine may also be provided with a knock detector 105, which appears schematically in FIGS. 3 and 5 and which outputs a signal when an knocking condition is encountered. Any appropriate control may be utilized for minimizing knocking, such as changing spark timing and/or fuel injection amount and timing as will also be discussed later.

The engine may be provided with a separate lubricating system that includes a lubricate tank. Thus there may be provided a lubricant level detector 106 that also provides a signal indicative of when the lubricant level is below a predetermined value. Like overheat conditions, this low lubricant level may be employed as a warning and the engine speed can be limited when the lubricant level, as sensed by the sensor 106, falls below a predetermined level. Any well known system for accomplishing this can be provided.

In addition to the engine temperature sensor 103, there may be also provided a thermal switch 107 that can be set to signal when an over-temperature condition exists as opposed to utilizing the output of the engine temperature sensor 103.

In applications where there are two outboard motors 24 mounted on the transom 23 of the same watercraft, as illustrated, if an abnormal conditions exists in one of these outboard motors and its speed is limited in the aforenoted manner, it is also desirable to ensure that the other outboard motor also has its speed limited. This improves directional control. There have been disclosed in the prior art various arrangements for providing this interrelated control and such a control is indicated schematically as 108 and is referred to as a DES (Dual Engine System) detector. This is a crossover circuit, indicated schematically at 109, which provides the signal for engine speed control to be transmitted to the normally operating engine as well as to the abnormally operating engine for the aforenoted reasons.

In addition to the actual engine and transmission condition detectors there may also be provided detectors that detect the condition of certain controls and auxiliaries such as a battery voltage detector 111, a starter switch detector 112 associated with a starter switch which controls an engine starter motor (not shown) and an engine stop or kill switch detector 113.

If battery voltage is below a predetermined value, certain corrective factors may be taken. Also, when the engine starter switch is actuated as indicated by the starter switch detector 112, the program can be reset so as to indicate that a new engine cycle of operation will be occurring. The engine stop switch detector 113 is utilized so as to provide a shutdown control for stopping of the engine which also may be of any known type. There is also provided a main switch 114.

In addition to those inputs noted, various other ambient engine or related inputs may be supplied to the ECU 96 for the engine management system.

The ECU 96 also is provided with a memory that is comprised of a volatile memory 118 and a nonvolatile memory 119. The volatile memory 118 may be employed for providing certain learning functions for the control routine. The nonvolatile memory 119 may contain maps for control during certain phases of non-feedback control, in accordance with the invention. The ECU 96 also controls, in addition to the fuel injectors 75 and the firing of the spark plugs 81, the high pressure fuel pump 73 and the lubricating pump which has been referred to but which has not been illustrated in detail. This lubricating pump is shown schematically at 115 in FIG. 5. Obviously, those skilled in the art will understand how these various controls cooperate with the components of the engine to provide their control, as will become apparent.

Figure 6:
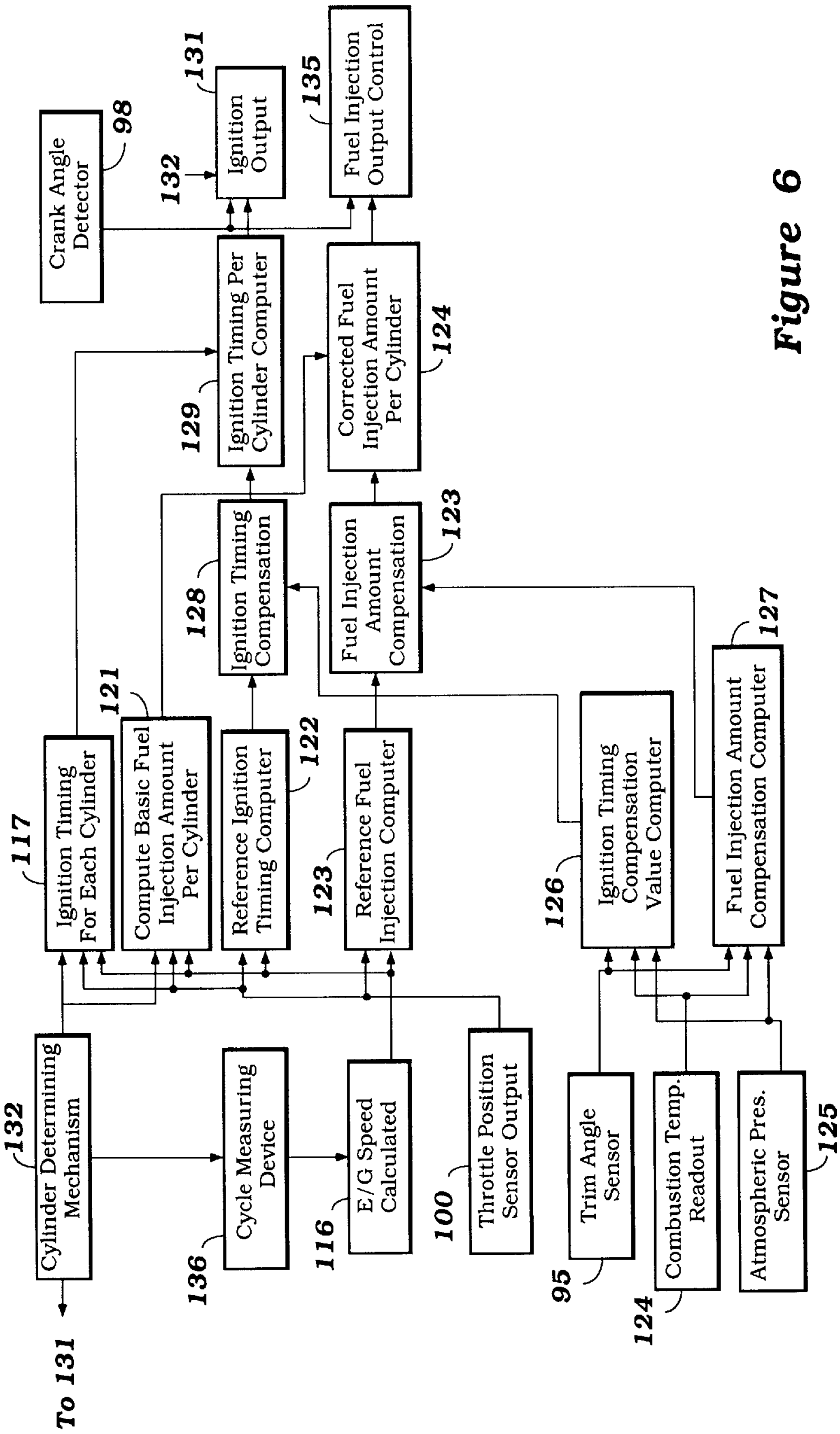
FIG. 6 is a further block diagram showing how the various detectors are interrelated to the various computing portions of the ECU and the outputs to the ignition and fuel controls.

Referring now to FIG. 6, this figure illustrates certain of the sensor outputs previously referred to and particularly in connection with FIG. 5 and the various sections of the ECU 96 and how they interrelate with each other so as to provide the basic fuel injection and ignition controls. This figure is obviously schematic and does not show all of the interconnections between the various sensors and control sections of the ECU 96. However, this figure is useful in permitting those skilled in the art to understand how the systems are interrelated before the actual control sequence will be described. FIG. 6 also shows primarily the method and apparatus by which the determination of the basic fuel injection timing and amount and ignition timing are determined.

Referring now specifically to this figure, the system includes a first section wherein the basic ignition timing, fuel injection timing and duration are computed. These basic timings and amounts are made from measuring certain engine parameters such as engine speed and load. In this embodiment, engine speed, calculated at the section 116, is determined by counting the number of pulses from the crank angle sensor 98 in a unit of time. In addition to providing the signal indicative of crank angle, by summing the number of pulses from the sensor 98 in a given time interval it will be possible to determine the actual engine rotational speed.

In addition to measuring the engine speed in order to obtain the basic control parameters, the engine load is also measured. This is done by utilizing the output of the throttle position sensor 100 although various other factors which determine the load on the engine can be utilized.

The outputs from the engine speed determination and throttle opening or load are sent to a number of calculating sections in the ECU 96. These include a section 117 that computes the ignition timing for each cylinder. This information is derived from an appropriate map such as may be reserved in the aforenoted nonvolatile memory 119 and is based upon the time before or after top dead center for each cylinder. By taking this timing and comparing it with the actual crankshaft rotation, the appropriate timing for all cylinders can be calculated.

In addition, the basic maps aforereferred to also contain an amount of fuel required for each cylinder for the sensed engine running conditions. This is in essence a basic fuel injection amount computation made in a section 121. This computation may be based either on fuel volume or duration of injection timing. Air flow volume and other factors may be employed to set the basic fuel injection amount.

The outputs from the engine speed calculation 116 and engine load or throttle position sensor 100 are also transmitted to a reference ignition timing computer 122 and a reference fuel injection computer 123. In addition to the outputs of the basic engine condition sensors (speed and load in the described embodiment) there are also other external factors which will determine the optimum basic fuel injection timing duration and ignition timing. These may include among the other things, the trim angle of the outboard motor as determined by the trim angle sensor 95 and the actual combustion temperature as indicated by a sensor indicated schematically at 124. Furthermore, the atmospheric or barometric pressure, all previously referred to also is significant and this is read by an appropriate sensor 125.

The outputs from these sensors 95 and 124 are transmitted to an ignition timing compensation computer section 126 and a fuel injection amount compensating computer 127. These compensation factors are determined also based upon known value maps programmed into the ECU 96.

The outputs from the reference ignition timing computer 122 and the compensation value computer 126 are transmitted to an ignition timing compensating circuit 128. This then outputs a signal to the ignition timing per cylinder compensating circuit 129 which receives also signals from the unit 117 that sets the ignition timing for each cylinder. This then determines the appropriate timing for the ignition output from a driver circuit 131 for firing the individual spark plugs 81.

The crank angle detector 98 also is utilized to determine the appropriate ignition timing as is the output from a cylinder determination means, indicated generally by the reference numeral 132 and which determines, in a way which will be described, which individual cylinder is to be fired, depending upon the angular position of the crankshaft.

A similar system is employed for the fuel injection volume control. That is, a section 133 receives the reference fuel injection amount signal from the section 123 and the compensation amount from the section 127 and processes a corrected fuel injection amount. This is then transmitted to the section 134 which also receives the basic fuel injection amount per cylinder calculation from the section 121 to determine the corrected fuel injection amount per cylinder. This amount is then output to a fuel injector control circuit 135 which again receives the signals from the crank angle detector and cylinder determinator to supply the appropriate amounts of fuel to each cylinder by controlling the duration of opening of the fuel injector.

Timing for the beginning of injection may also be controlled in a like manner. The system also includes a cycle measuring arrangement 136 which determines the actual cycle of operation as will also be described later.

The basic control routine by which the actual fuel injection timing amount and ignition timing are determined will now be described beginning by reference to FIG. 7 and carrying on to those figures which follow it. As will become apparent, the basic concept operates primarily to set a basic fuel injection amount and timing determined by engine speed and load as aforenoted. Once the system is operating and the oxygen sensor 97 is at its operating temperature, the system shifts to a feedback control system. This feedback control system is superimposed upon the basic fuel injection amount and timing and spark timing so as to more quickly bring the engine to the desired running condition.

The output or combustion condition in one combustion chamber only is sensed and that signal is employed for controlling the other cylinders. In addition, there are some times when cylinders are disabled to reduce the speed of the engine for protection, as has also been noted. This system ensures proper control also during these times even if the disabled cylinder is the one with which the sensor is associated.

The control routine will now be described initially by reference to FIG. 7 with the discussion continuing onto the remaining figures where necessary. The program starts and goes to the step S11 where the system is initialized. The program then moves to the step S12 wherein the ECU 96 determines the operational mode. This operational mode may be of one of many types such as starting, normal running and stop and is based upon primarily the results of the inputs from the sensors as shown in FIG. 5.

As noted the available modes may include start-up mode when the engine is first started. As previously noted, there is a starter switch 112 and, when the starter switch has been initiated and the program has just begun, the ECU 96 will assume the starting mode and go into the appropriate control routine for that starting mode. This start up mode of operation will employ neither feedback control nor necessarily sensing of engine running conditions, but rather set the appropriate parameters for engine starting and/or warm-up as will be described in more detail later as this control is that to which the invention primarily relates.

Another potential mode is the operation when a cylinder or more is being disabled to effect speed control and protection for a so-called “limp home” mode. This mode will also be described later by reference to certain of the remaining figures and is based upon the sensing of other conditions which will now be also mentioned.

The disabling of cylinders to protect the engine may occur in response to the sensing of a number of critical features. One of these features is if the engine is operating at too high a speed or an over-rev condition. Another condition is if the engine temperature is too high or is approaching a high level where there may be a problem. Another feature, as has been noted, is if there is a low oil level in the oil reservoir. A still further condition is if there is a dual engine system and one of the engines experiences one of the aforenoted conditions and, thus, both engines will be slow even though one engine may not require this.

Having determined the operational mode at the step S12, the program moves to the step S13 to determine which of the two time programs or control loops are presently occurring. The system is provided with two separate control loops: loop 1, which repeats more frequently than the other loop (loop 2). The timing for loop 1 may be 4 milliseconds and the timing for loop 2 may be 8 milliseconds. These alternative control loops are utilized so as to minimize the memory requirements and loading on the ECU 96.

Figure 9:
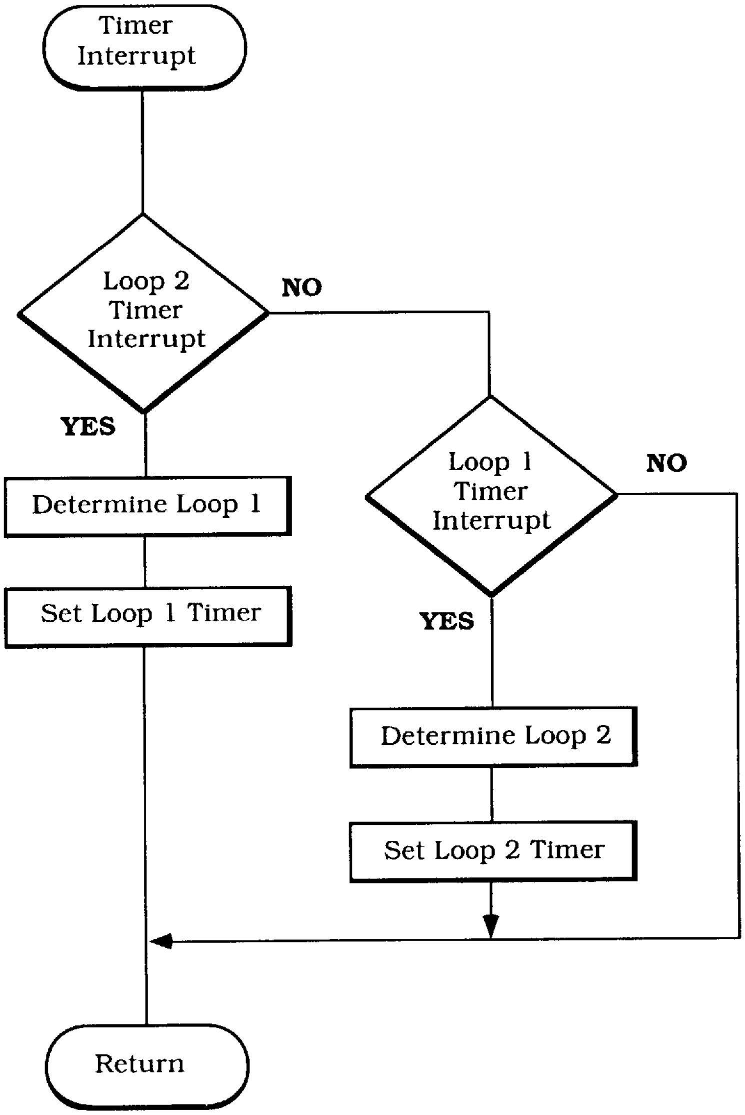
FIG. 9 is a block diagram showing the control routine of the timer interrupt sequence of operation.

FIG. 9 shows how the system determines which control loop the program is operating on. As may be seen in this figure, it begins when the timer is interrupted and then moves to the first step to determine if loop 2 timer has been interrupted. If it has not, the program moves to a step to determine if the loop 1 timer has been interrupted. If it has not, the program then returns. If, however, it is determined that the loop 1 timer has been interrupted, then the program moves to the next step to determine that the system is operating on loop 2 and then moves to set the timer for loop 2.

If, however, at the first step it is determined that the loop 2 timer has been interrupted, then the program moves to the next step to determine that loop 1 is being run and the program move to the next step to set loop 1 timer. Regardless of which timer is set, the program then returns.

Assuming that the loop 1 mode has been determined at the step S13, the program moves to the step S14, first to read the output of certain switches. These switches may include the main engine stop or kill switch 113, the main switch for the entire circuit 114 or the starter switch 112. The purpose for reading these switches is to determine whether the engine is in the starting mode or in a stopping or stopped mode so as to provide information when returning to the step S12 to determine the proper control mode for the ECU 96 to execute.

Having read the switches at the step S14, the program moves to the step S15 so as to read certain engine switch conditions which may determine the necessary mode. These switches may include, for example, the output from the knock detector 105 and/or the output from the throttle position sensor 100.

If loop 1 is not being performed at the step S13 or if it and the steps S14 and S15 have been completed, the program moves to the step S116 to determine if the time has run so as to initiate the loop 2 control routine. If the time has not run, the program repeats back to the step S12.

If the system is operating in the loop 2 mode of determination, the program then moves to the step S17 to read the output from certain additional switches. These switches can constitute the lubricant level switch 106, the neutral detector switch 101 and the DES output switch 108 to determine if any of these specific control routines conditions are required.

Having read the second series switches at S17, the program then moves to the step S18 to read the outputs from additional sensors to those read at the step S15. These sensors include the atmospheric air pressure sensor 104, the intake air temperature from the sensor 99, the trim angle from the trim angle sensor 95, the engine temperature from the engine temperature sensor 103 and the battery voltage from the battery sensor 111.

The program then moves to the step S19 to determine if cylinder firing disabling is required from the outputs of the sensors already taken at the steps S17 and/or S18. The program then moves to the step S20 so as to provide the necessary fuel pump and oil pump control.

The program then moves to the step S21 to determine if the system should be operating under normal control or misfire control. If no misfire control is required because none of the engine protection conditions are required, then the program moves to the step S22 to determine from the basic map the computation of the ignition timing, injection timing and amount of injection per cylinder. As has been previously noted, this may be determined from engine speed and engine load with engine load being determined by throttle valve position. This basic map is contained in the nonvolatile memory 119 of the ECU 96 as previously noted.

If at the step S21 it is determined that the program requires misfire or speed control by eliminating the firing of one cylinder, the program moves to the step S23 to determine from a further map, referred to as a disabled cylinder map, the ignition timing and injection timing and duration. This map is also programmed into the nonvolatile memory 119 of the ECU 96 from predetermined data and is based upon the fact that the engine will be running on a lesser than total number of cylinders.

Figure 8:
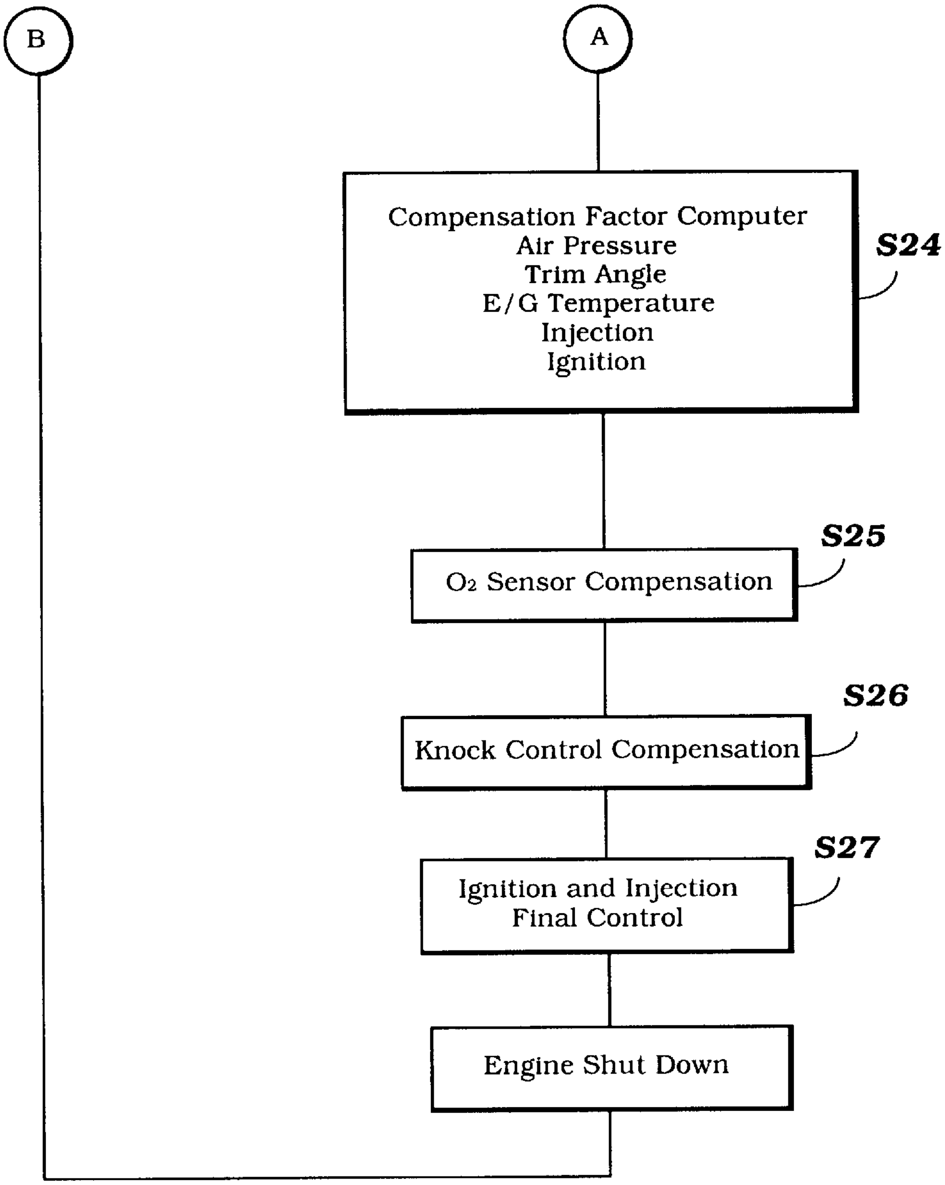
FIG. 8 is a partial block diagram of the remainder of the control routine shown in FIG. 7.

Once the basic ignition timing and injection timing and amount are determined at the appropriate steps S22 or S23, the program then moves to the step S24 (See now FIG. 8) so as to compute certain compensation factors for ignition and/or injection timing. These compensations are the same as those compensations which have been indicated as being made at the sections 128 and 129 and 133 and 134 of FIG. 6.

These compensation factors may include such outputs as the altitude pressure compensation, trim angle compensation and engine temperature compensation determined by the outputs from the sensors 104, 95, and 103, respectively. In addition, there may be compensation for invalid injection time and ignition delay made at the step S24.

The program then moves to the step S25 to determine if the engine is operating under oxygen feedback control and to make the necessary feedback control compensations based upon the output of the oxygen sensor 97.

The program then moves to the step S26 to determine if the output from the knock sensor 105 requires knock control compensation which may include either adjustments of spark timing and/or fuel injection amount. The program then moves to the step S27 so as to determine the final ignition timing injection timing and amount.

Another phase of the control routine will now be described by reference to FIG. 10. This phase has to do with the timing information primarily and certain procedure associated with the cylinder disabling mode for engine speed reduction and protection. The program begins when the timing sensor 98 indicates that the crankshaft is at top dead center. The program then moves to the step S28 to determine which cylinder it is that is at top dead center. This is done by utilizing the outputs of the cylinder position detectors 102.

The program then moves to the step S29 to ascertain from the order of approach of the cylinders to top dead center whether the engine is rotating in a forward or a reverse direction. It should be noted that, particularly on start-up, there is a possibility that the engine may actually begin to run in a reverse direction. This is a characteristic which is peculiar to two-cycle engines because of their inherent cycle operation.

If at the step S29 it is determined that the engine is rotating in a reverse direction, the program moves to the step S33 so as to initiate engine stopping. This may be done by ceasing the ignition and/or discontinuing the supply of fuel.

If at the step S29, however, it has been determined that the engine is rotating in the proper, forward direction, the program moves to the step S30 to measure the cycle of operation of the engine and then to the step S31 so as to actually compute the engine speed from the number of pulses from the crank position sensor 98 in relation to time, as previously noted. The program moves to the step S32 to determine if the engine speed is more than a predetermined speed. If the engine speed is too low, the program again proceeds to the step S33 where the engine is stopped.

If the engine continues to be operated, the program moves the step S34 to determine if the immediately detected cylinder is cylinder number 1. Cylinder number 1 is the cylinder with which the oxygen sensor 97 is associated. If the cylinder number 1 has not been the one that is detected, the program skips ahead to the point which will be discussed below.

If, however, it is determined at the step S34 that cylinder number 1 is the cylinder that is being immediately sensed, the program then moves to the step S35 to determine if the engine is operating in a cylinder disabling move. If it is not, the program moves to the step S36 so as to clear the register of the disabling information because the engine is now operating under a normal condition.

If, however, at the step S35 it is determined that the system is operating in the disabled cylinder mode so as to reduce or control maximum engine speed, the program moves to the step S37 to determine if the pattern by which the cylinder is disabled should be changed. As has been previously referred to, if the engine is being operated with one or more cylinders disabled so as to limit engine speed for the limp home mode, it is desirable to only disable a given cylinder for a predetermined number of cycles. If the disabling is extended, then on returning to normal operation the spark plug in the disabled cylinder may be fowled and normal operation will not be possible or will be very rough.

Thus, at the step S37 it is determined that the cylinder disabled has been disabled for a time period where it should be returned to operation, the program moves to the step S38. In the step S38, the disabling of the cylinder is switched from one cylinder to another in accordance with a desired pattern.

If it is not time to change the disabled cylinder at the step S37 or if the disabled cylinder number is changed at the step S38, the program then moves to the step S39 so as to set up or update the information as to the cylinder which is being disabled and the ignition disabling for that cylinder. The program then moves to the step S40 so as to actually step up the ignition pulse for the disabled cylinder and ensure that the cylinder will not fire. The program then moves to the step S41 so as to also ensure that the disabled cylinder will not receive fuel from the fuel injection. Then at the step S42, the disabling of injection pulse for the cylinder is also initiated. The program then moves to return.

Figure 10:
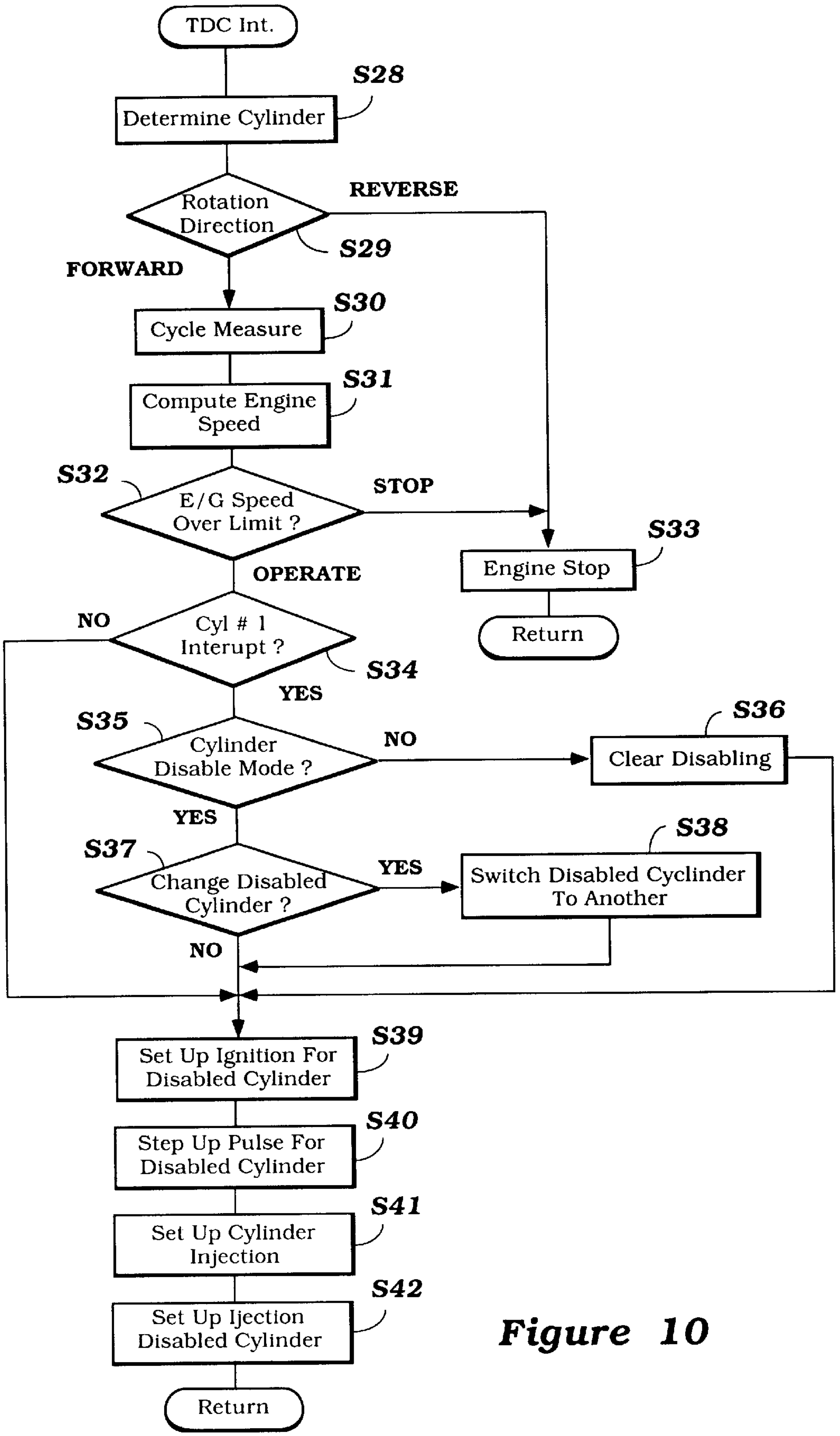
FIG. 10 is a further block diagram showing a further portion of the control routine including the condition when one cylinder is disabled to control or limit the engine speed.
Figure 11:
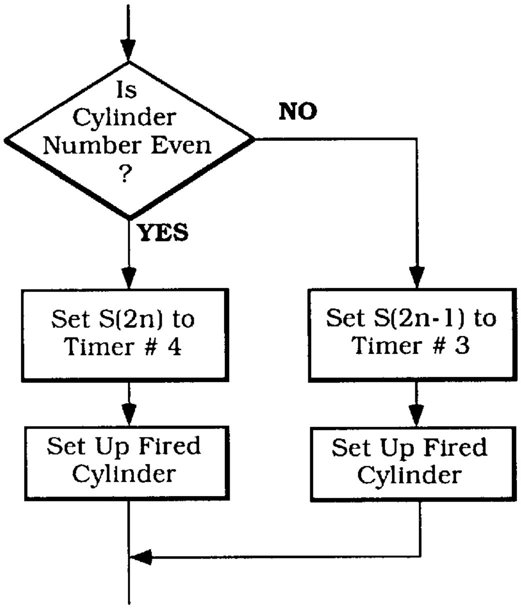
FIG. 11 is a block diagram showing a further portion of the control routine shown in FIG. 10 in sensing the respective cylinders.

FIG. 11 is a detailed subroutine that shows how the ignition pulse for the disabled cylinder at the step S40 in FIG. 10 is determined. In order to minimize the memory requirements and to permit faster computer operation, the system is provided with two timers, one associated with those cylinder numbers that are even, and one that is associated with those cylinder numbers that are odd (Timers #3 and #4). This cylinder number is based upon the firing order. Those skilled in the art will understand the advantages of using the two timers rather than a single timer. In the specific example, the engine is a V-6, as has been noted, and, therefore, the firing of the cylinders is at an equal 60° angle. The cylinders in one bank are even numbered while those in the other bank are odd numbered.

Timer number 3 is utilized for odd-numbered cylinders while timer number 4 is used for even-numbered cylinders. Hence, when the program initially begins to set up the ignition pulse for the cylinder at the step S4, it is determined at the initial step if the cylinder number to be controlled is an even number or an odd number. If it is an odd number, the program moves to the right-hand side so as to set the timer for cylinder number 3 to be equivalent to the determine cylinder times 2 minus 1, that is, S is (2n−1) for the timer. From this, then the timing for the next cylinder number on the odd sequence is set from this information. On the other hand, if the cylinder number is even, the timer number 4 is utilized and the timing for the next cylinder is set as 2n. The program then moves to the next step so as to set up the appropriate ignition timing for this.

Figure 12:
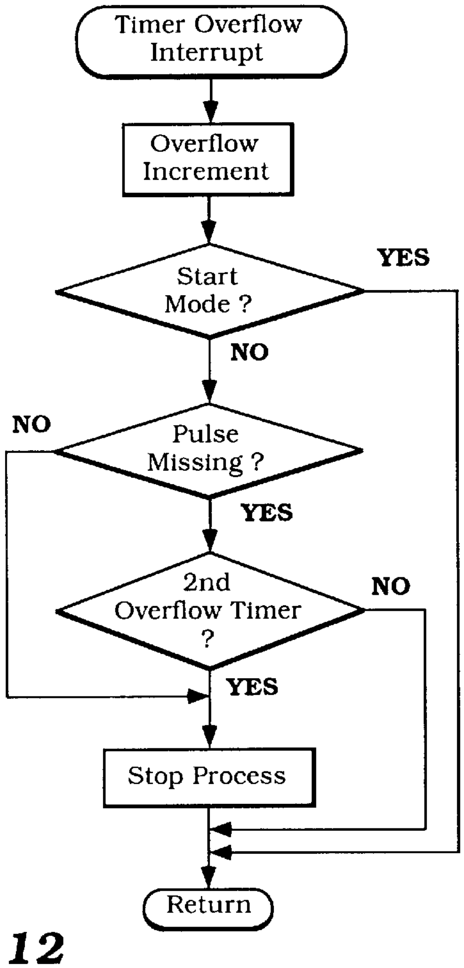
FIG. 12 is a block diagram showing a portion of the control for shut down utilized in FIG. 10.

FIG. 12 shows a control routine that is employed so as to stop the engine if the engine is running too slow. This is an explanation of the control routine which takes place basically in steps S30–S32 of FIG. 10.

If the engine is permitted to run at a speed that is too slow, the plugs will eventually foul and the engine will stall. If the engine is permitted to continue to run until its stalls, then restarting or resumption to normal operation will be difficult. Therefore, when the ECU 96 determines by the control routine of FIG. 12 that the engine is running too slow and fouling will occur to cause stalling, the engine is shut down before that occurs.

There is, therefore, set a timer which counts the time between successive ignition pulses. And thus, at the first step in this figure, the timer overflow interruption is set and in the next step it is determined if the time between successive pulses is excessive because of an overflow of the timer then the program moves to a step to determine if the engine is in the original starting mode.

The reason it is determined if the engine is in original starting mode is that during initial engine starting the speed of the engine will be lower than the normal stalling speed at least initially. Thus, it is desirable not to effect stopping of the engine if the engine is in the original start-up mode because the engine would never be started otherwise. Thus, if it is determined at the start mode step of FIG. 12 that the engine is in the starting mode, the program jumps to the return. If, however, it is determined that the engine is not in a starting mode, then the program moves to the next step to determine if a pulse has been missed. If a pulse has not been missed, as would be the case if there was a cylinder disabling for reducing the speed, then it is determined that the time interval is too long and the program immediately jumps to the step where the stopping process of the engine is initiated. Engine stopping is accomplished by discontinuing the firing of the ignition for all cylinders and/or the supply of fuel to all cylinders.

If, however, a pulse has been missed it may be because of the fact that the next successive cylinder is one which is not being fired in any event. Then the program moves to another step where the time between pulses is determined to be twice the normal pulse interval so as to accommodate a skipped cylinder. Thus, if the firing between two cylinders exceeds the time interval between 120° plus a time factor at this step, then it is assumed that the engine is running too slow and the program again initiates the stop process so as to stop running the engine and prevent plug fowling.

Figure 13:
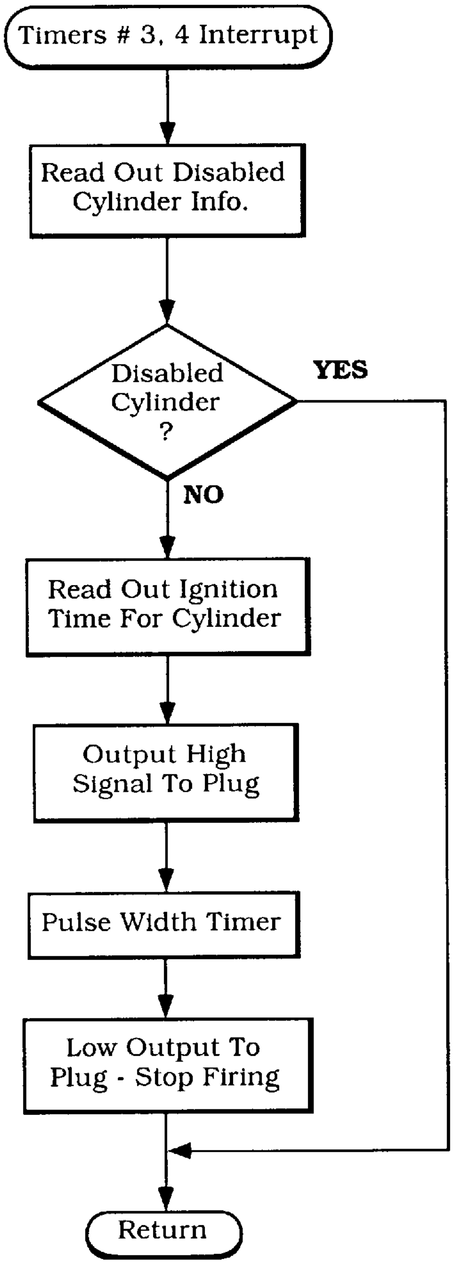
FIG. 13 is a block diagram showing more details of the control routine during cylinder disabling.

FIG. 13 shows the arrangement for controlling the condition when cylinders are disabled. This program starts out by reading the interruption phases from the pulses of the individual cylinders at timers #3 and #4. The program then moves to the next step to read out the disabled cylinder information and identify the cylinder which is being disabled.

The program then moves to the next step to see if the cylinder in question is the cylinder which is being disabled. If so, the program moves to return. If, on the other hand, the cylinder is not a disabled cylinder, then the program moves to the step to read the ignition output for that cylinder and determine the timing interval.

The program then moves to the next step to output a high pulse to the spark coil for that cylinder to effect its sparking.

The program then moves to the next step to set the pulse width timer for the duration of the plug firing, and finally to the step when the ignition output port is returned to the low value and ignition is discontinued.

Having described generally the basic concept by which basic engine running control is accommodated, the reader should have sufficient background to understand the facets involving the basic control upon which the control routine in accordance with which the invention is based. The invention here deals with the provision of a shift assist mechanism which incorporates an arrangement wherein the speed of the engine is reduced if the operator attempts to effect a shift and more than a predetermined force is exerted, how that system interrelates with the system for disabling cylinders in the event of a dangerous condition and the way in which the engine is rapidly slowed down.

Figure 4:
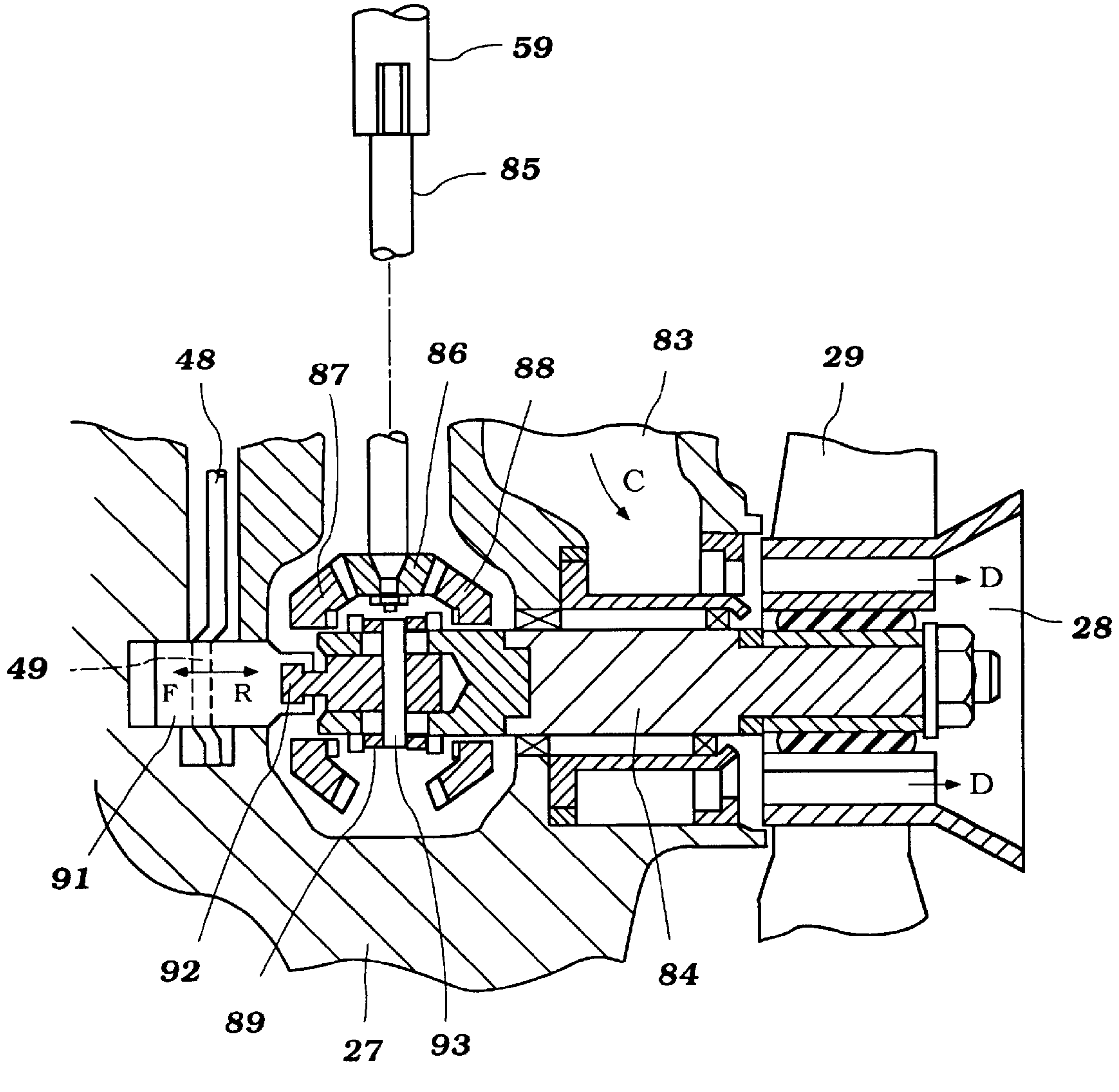
FIG. 4 is a partial cross-sectional view showing the transmission in the lower unit of one of the propulsion devices.

With conventional transmissions of the type shown in FIG. 4, the dog clutching arrangement between the clutching sleeve 89 and the bevel gears 87 and 88 is capable of transmitting high powers. However, because of the very nature of this transmission, high shifting forces may occur when attempting to effect a shift. This is particularly true when the engine is operating at a high speed or high power output. Therefore, and as is conventional with this type of transmission, there is provided a shift detector or shift cut switch which actually measures the force exerted by the operator when attempting to effect a shift. These arrangements normally include some form of spring biased lost motion connection for sensing the shifting force.

When the shifting force is above a predetermined value, then a shift cut operation is accomplished. This is done normally by cutting the ignition to one or all cylinders for a time period so as to cause a rapid reduction in engine speed. When this occurs, then the engine speed falls so that the shift can be accomplished, and the speed again resumes. However, if the engine is operating in a disabling mode, then this additional speed reduction could cause the engine to stall. Restarting may be difficult or impossible under these conditions.

Therefore, in accordance with the invention, a control routine is incorporated whereby if there is a disabling mode for engine protection, this mode takes preference over the shift cut, and the shift cut will not occur. In addition, the system operates so as to provide during shift cut continued unabated fuel injection to the engine by the fuel injector 75. This will ensure against backfiring. This system will now be described by reference first to FIG. 14.

Figure 7:
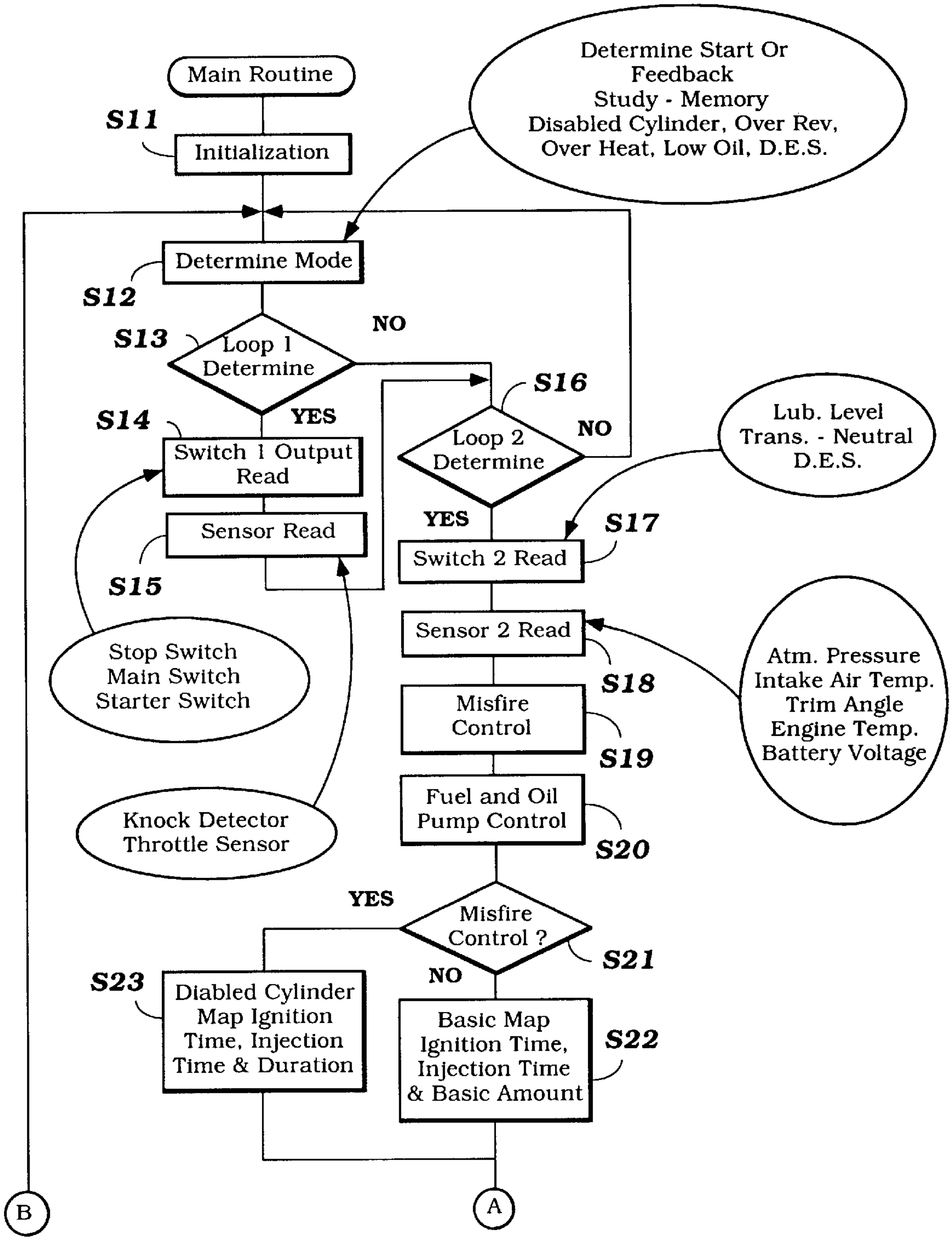
FIG. 7 is a partial block diagram showing the initial portion of the main control routine wherein the system provides the control depending upon whether or not a cylinder is disabled to slow the engine speed because of an encountered abnormality that could cause engine damage if not controlled.
Figure 14:
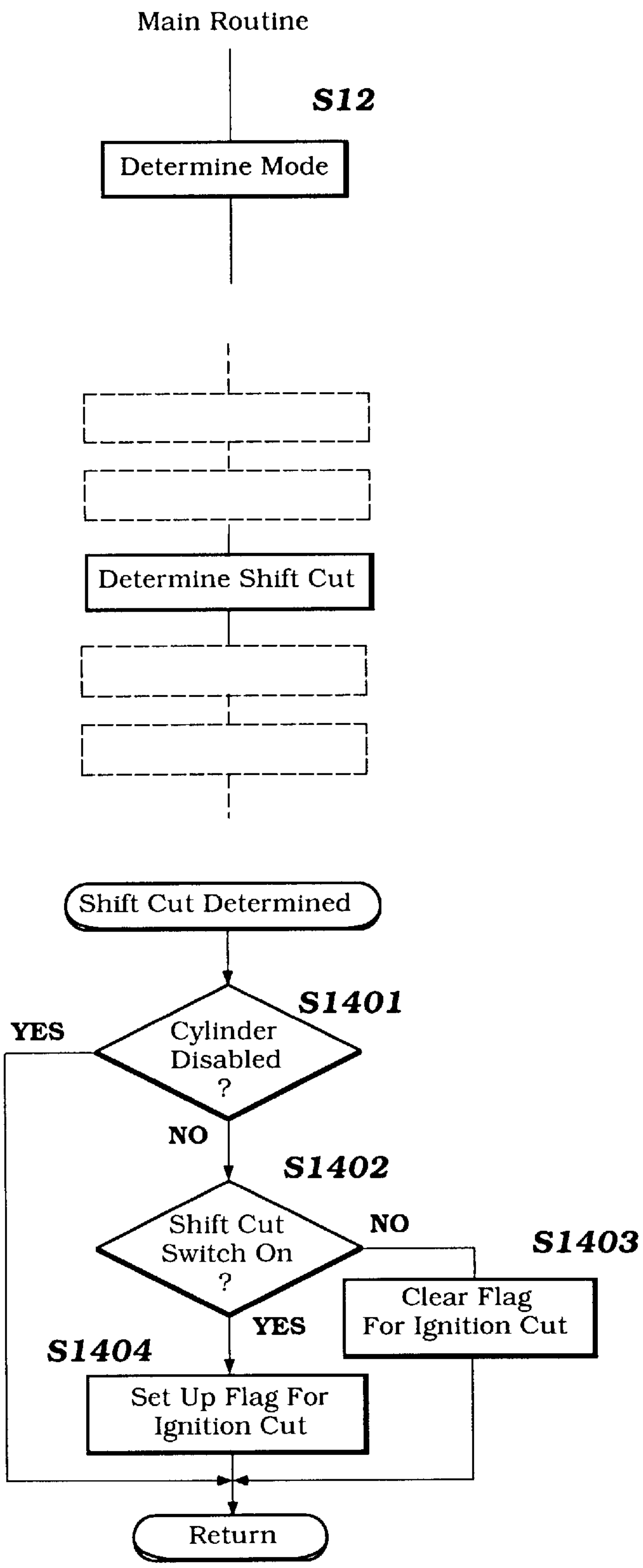
FIG. 14 is a partial block diagram showing portions of the control routine for determining the operational stage, determining when a shift cut is required and showing the control routine for setting up the flags during the cylinder disabling and shift cut modes of operation.

FIG. 14 is a view which is in part similar to the overall control routine, and particularly the portion shown in FIG. 7. This program operates so as to perform during the determination of the operational stage at the step S12 the sensing if a shift cut has been demanded because of the sensing of a high force in the shifting control mechanism. This is shown partially in the portion of FIG. 14 indicated at b. That is, this is another one of the determinations which is made at the step S12.

If, at the step S12, it has been determined that a shift cut is called for, then the program moves to the routine shown in subview C of FIG. 14. In this routine the program begins when a shift cut is determined, and then moves to the step S1401 to determine if cylinder disabling is being accomplished due to the sensing of a condition which requires engine protection. If cylinder disabling is being called for, then the program jumps to the return.

If, however, it is determined at the step S1401 that there is no cylinder disabling occurring because of the existence of an abnormal condition which requires protection, then the program moves to the step S1402.

At the step S1402 it is determined if the shift cut switch is still on. If it is not, the program moves to the step S1403 to clear the flag for ignition cut and jumps to return.

If, however, the shift cut switch is on, then the program moves to the step S1404 to set up the flag for ignition cut, and ignition cut is accomplished in the normal manner to reduce engine speed until the high resistance to shifting has abated, and the program returns.

It should be noted that when the shift cut is called for and ignition is interrupted, fuel injection is continued at the same rate as determined by the conditions which existed at the time shift cut was called for. That is, fuel injection is continued unabated. This avoids the likelihood of backfiring.

Figure 15:
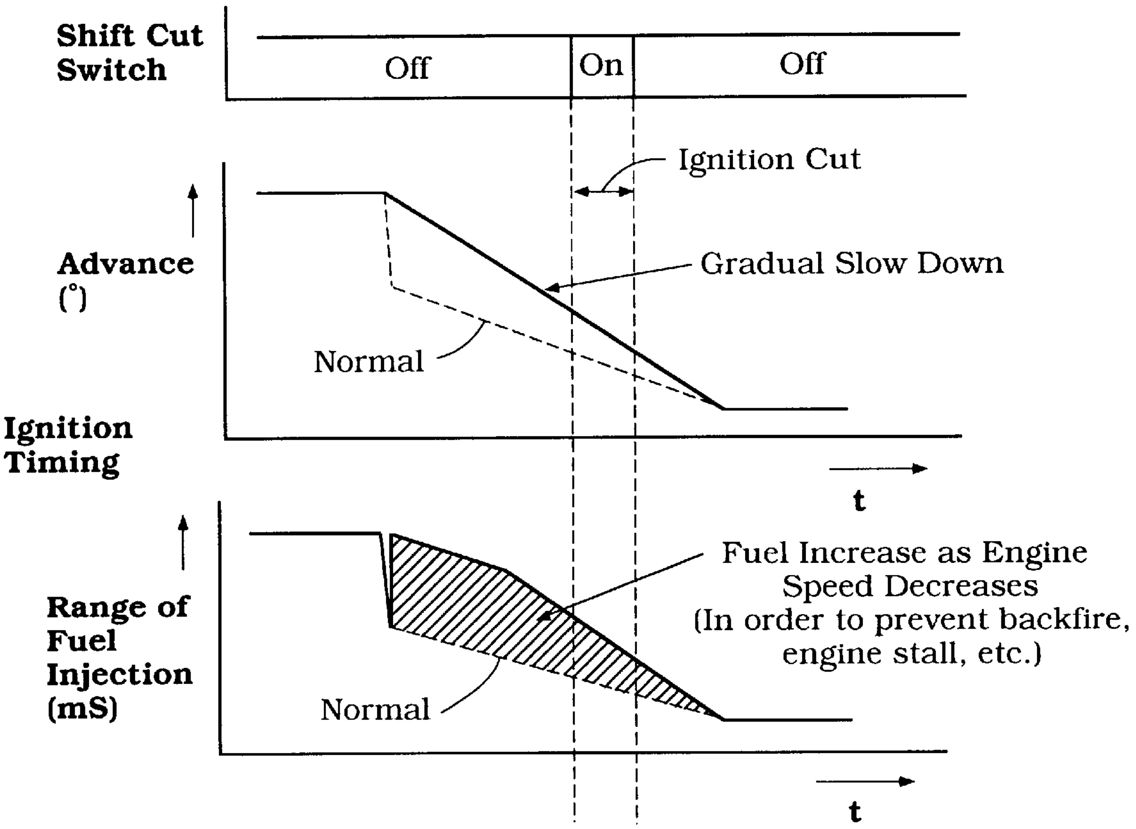
FIG. 15 is a graphical view showing how the rapid deceleration mode is accomplished and the spark timing and fuel injection amount during this control routine and also the effect of shift cut on the rapid slowdown routine.

FIG. 15 is a graphical view showing the condition of the shift cut, and also the spark timing advance and amount of fuel injection. This figure also depicts how the system operates with an improved control routine so as to improve engine performance and also avoid backfiring when the operator calls for a sudden reduction in engine speed.

As may be seen in the middle figure, which shows ignition timing, and by the broken-line portion of this figure, when the operator calls for rapid speed reduction by rapidly closing the throttle control lever, the spark advance will be retarded significantly and then gradually to the normal curve. However, this abrupt change in spark timing does not provide smooth operation, and in accordance with a feature of the invention, the spark timing is returned gradually, as shown by the solid-line curve.

This figure also shows how fuel injection is controlled during rapid slowdown. As seen in the broken-line curve, when the operator immediately calls for speed reduction, the fuel supply will also drop abruptly. This also can provide problems such as backfiring, engine stall, etc. Therefore, when a rapid deceleration is called for, the program increases the amount of fuel, as shown by the shaded line, from that which would otherwise be dictated by the position of the throttle control so as to avoid these detrimental effects.

FIG. 15 also shows a condition where the operator attempts to make a shift during the rapid speed reduction and the shift is resisted by more than a predetermined force. As will be seen by the period when the shift cut switch is on, ignition is totally discontinued or interrupted. However, even though ignition is discontinued, fuel supply is continued by continuing to inject fuel from the injectors 75. This also reduces the likelihood of backfire, engine stalling, and other detrimental effects. This routine is also followed when shifting without rapid deceleration conditions.

Figure 16:
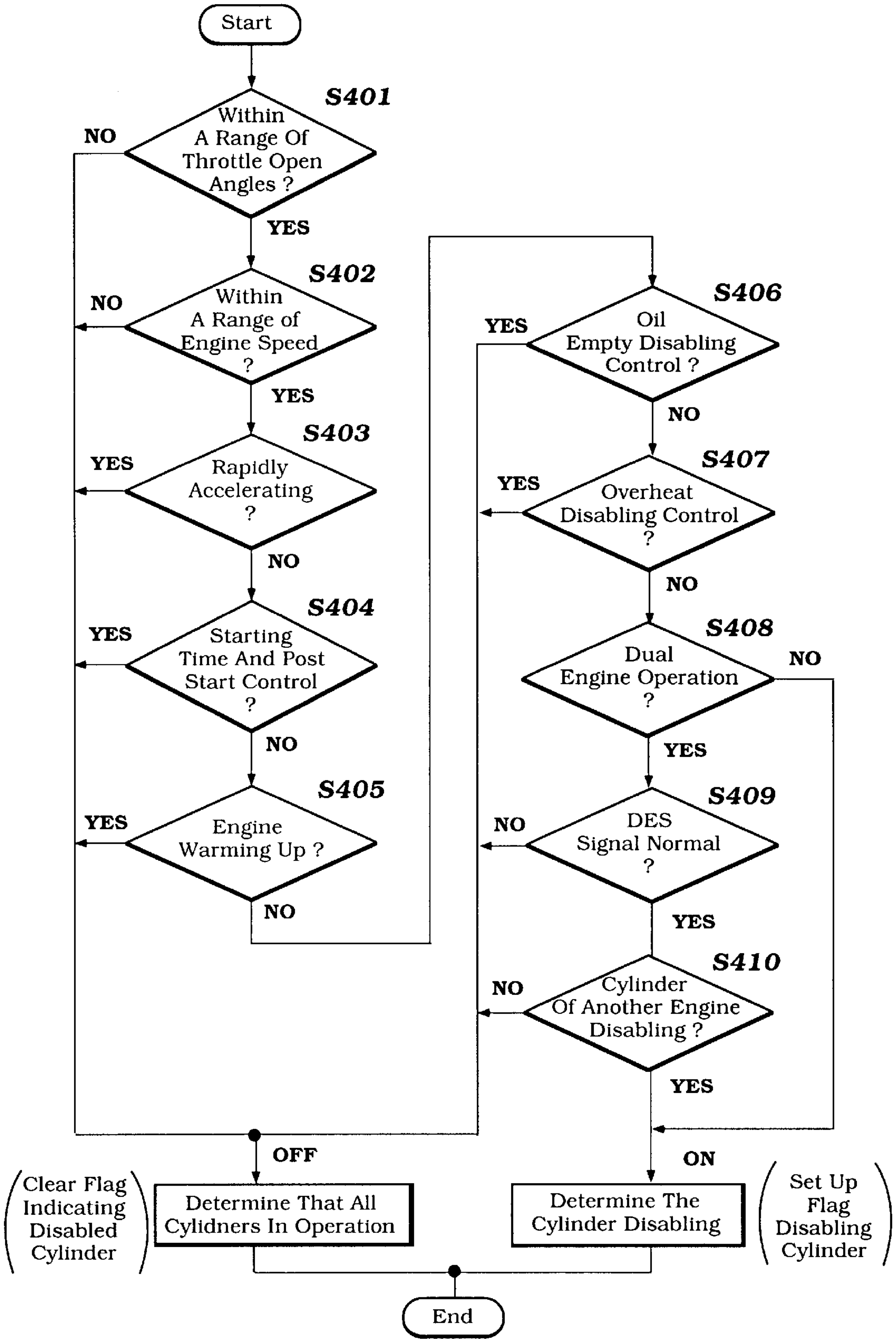
FIG. 16 is a diagrammatic block view showing the various control modes and to determine when shift cut speed reduction will be permitted and when it will not be permitted.

FIG. 16 is a block diagram showing the control routine which the system goes through to determine if, at the left-hand side of this view toward the bottom, the engine is operating in a normal mode when all cylinders are operating so that it is possible to disable the cylinders if required for either shift or engine protection control, or if, on the right-hand side, the system is operating in a condition where there is disabling control and the shift control will not be permitted.

The program starts and at the step S401 determines if the throttle is operating so that the throttle control is in an opening less than a predetermined opening. If it is not and the throttle approaches wide open conditions, the program moves ahead to determine that the engine is in a condition where cylinder disabling will be permitted. In this condition, the flag indicating the existence of a disabled cylinder operation is cleared or lowered.

Assuming that the throttle opening is in the predetermined small range, the program then moves to the step S402 to determine if the engine is operating in a range of speeds where the speed is below a predetermined high speed range where cylinder disabling may occur. If it is not, the program moves to the end where cylinder disabling is permitted.

If, however, the answer at the steps S401 and S402 are both yes, the program then moves to the step S403 to determine if the engine is accelerating or decelerating rapidly. If it is, the program again moves to the end through the step where disabling will be permitted and is not occurring.

If, however, there is not rapid acceleration or deceleration, the program then moves to the step S404 to determine if the start time has passed, and it is operating in the post-start control range or normal warming-up and running range. If it is, the program again moves to the end through the step that permits cylinder disabling.

If the answer is no at the step S404, the program moves to the step S405 to determine if the engine is in a warming-up mode. If it is, then the program again moves to the step where all operational cylinders are permitted, but disabling is possible.

If the answer is no at the step S405, the program moves to the step S406 to determine if the oil level is low so that disabling control is required. If it is, the program moves to the end through the step that will permit disabling. If it is not, however, the program moves to the step S407 to determine if the temperature is overheated so that disabling may be required. If, at the step S407, it is determined that disabling is required, the program moves to the end through the step that permits disabling, since the disabling flag has been cleared.

If, however, at the step S407 it is determined that protection because of the overheat condition is not required, the program moves to the step S408. At the step S408 it is determined if there is dual-engine operation, that is, where the engines are operating independently of each other. If they are not, then the program jumps to the step where the cylinder disabling is occurring, and the flag for disabling cylinders is set.

If, however, at the step S408 it is determined that there is interrelated dual-engine control, then the program moves to the step S409 to see if the signal is normal. If it is not, the program moves to the end through the step that permits disabling.

If, at the step S409, the DS signal is normal, then the program moves to the step S410 to see if a cylinder of the other engine is being disabled. If it is, the program moves to the end through the step which determines that cylinder disabling is required and sets the flag. If not, however, the program moves to the end through the step that permits disabling if required.

Thus, from the foregoing description it should be readily apparent that the described engine control permits good shift control without stalling, and also interrelates the shift control with the other disabling control so that if the engine is being slowed because of an abnormal condition, then the imposition of shift control cannot occur. In addition, the slow-down mode is operated in such a way so as to avoid backfiring under rapid slow-down by providing extra fuel, and also the system operates so as to ensure that during cylinder disabling that fuel will be supplied to the disabled cylinder so as to avoid the likelihood of backfiring. Of course, the foregoing description is that of a preferred embodiment of the invention and various changes and modifications may be made without departing from the spirit and scope of the invention, as defined by the appended claims.

I claim:

1. A marine propulsion system including a multi-cylinder spark-ignited internal combustion engine, a propulsion device for propelling an associated watercraft, a change-speed transmission for interconnecting said engine to said propulsion device for driving said propulsion device at varying ratios, shift control means for effecting shifting of said change-speed transmission, a plurality of fuel injectors for supplying fuel to the cylinders of said engine, a control system for controlling the timing and duration of fuel injection by said fuel injectors and the timing of firing of spark plugs of said engine, means for sensing the force applied to said shift control means, and means for interrupting the ignition of at least some of said spark plugs for disabling the firing of the cylinders associated with the interrupted spark plugs when more than a predetermined force is exerted to shift control means and for continuing the injection of fuel to the disabled cylinders by said fuel injectors when the ignition of the spark plugs is interrupted.

2. A marine propulsion device as defined in claim 1, further including means for sensing an abnormal engine condition and slowing the speed of said engine by disabling the operation of at least some of the engine cylinders and, means for preventing further disabling of the cylinders if more than a predetermined force is exerted to the transmission control during the time when cylinders are being disabled for engine protection.

3. A marine propulsion device as defined in claim 2, wherein fuel is continued to be supplied to the disabled cylinders by the fuel injectors during cylinder disabling.

4. A marine propulsion device as defined in claim 1, further including means for sensing a demand for a rapid engine speed reduction and for retarding the spark timing in response to the sensing of such a condition.

5. A marine propulsion device as defined in claim 4, further including means for continuing to supply fuel to the engine by all of the fuel injectors at the time when the spark advance is retarded during rapid slow-down.

6. A marine propulsion device as defined in claim 5, further including means for sensing an abnormal engine condition and slowing the speed of said engine by disabling the operation of at least some of the engine cylinders and, means for preventing further disabling of the cylinders if more than a predetermined force is exerted to the transmission control during the time when cylinders are being disabled for engine protection.

7. A marine propulsion device as defined in claim 6, wherein fuel is continued to be supplied to the cylinders by the fuel injectors during cylinder disabling.

8. A marine propulsion system having a spark-ignited internal combustion engine, a fuel injector for supplying fuel to said engine for combustion therein, a propulsion device for propelling an associated watercraft, a change-speed transmission for transmitting drive at selected ratios from said engine to said propulsion device, a shift actuator for operator control of said change-speed transmission, means for sensing an abnormal engine condition, control means for controlling the timing of firing of the spark plug of said engine and the timing and duration of fuel injection by said fuel injector in response to an engine running condition, means for effecting a slowing of the engine in the event more than a predetermined force is exerted to effect said transmission control, means for slowing the speed of said engine in response to the sensing of an abnormal engine condition, and means for precluding the effecting of slowing of the speed of the engine in response to a sensed abnormal condition and in the event more than predetermined force is exerted to the transmission control.

9. A marine propulsion device as defined in claim 8, wherein the engine has a plurality of cylinders and fuel injectors and fuel is continued to be supplied to the cylinders by the fuel injectors during the time the speed of the engine is slowed.

10. A marine propulsion device as defined in claim 8, further including means for sensing a demand for a rapid engine speed reduction and for retarding the spark advance in response to the sensing of such a condition.

11. A marine propulsion device as defined in claim 10, further including means for continuing to supply fuel to the engine by the fuel injectors at the time when the spark advance is retarded during rapid slow-down.

12. A method of operating a marine propulsion system including a multi-cylinder, spark-ignited, internal combustion engine, a propulsion device for propelling an associated watercraft, a change-speed transmission for interconnecting said engine to said propulsion device for driving said propulsion device at varying ratios, shift control means for effecting shifting of said change-speed transmission, a plurality of fuel injectors for supplying fuel to the cylinders of said engine, said method comprising the steps of controlling the timing and duration of fuel injection by said fuel injectors and the timing of firing of spark plugs of said engine, sensing the force applied to said shift control means, and interrupting the ignition of at least some of said spark plugs when more than a predetermined force is exerted to shift control means and continuing the injection of fuel to the cylinders associated with the interrupted spark plugs by said fuel injectors.

13. A method of operating a marine propulsion device as defined in claim 12, further including the steps of sensing an abnormal engine condition and slowing the speed of said engine by disabling the operation of at least some of the engine cylinders, and preventing further disabling of the cylinders if more than a predetermined force is exerted to the transmission control during the time when cylinders are being disabled for engine protection.

14. A method of operating a marine propulsion device as defined in claim 13, wherein fuel is continued to be supplied to the cylinders by the fuel injectors during cylinder disabling.

15. A method of operating a marine propulsion device as defined in claim 12, further including the steps of sensing a demand for a rapid engine speed reduction and retarding the spark in response to the sensing of such a condition.

16. A method of operating a marine propulsion device as defined in claim 15, further including the step of continuing to supply fuel to the engine by the fuel injectors at the time when the spark is retarded during rapid slow-down.

17. A method of operating a marine propulsion device as defined in claim 16, further including the steps of sensing an abnormal engine condition and slowing the speed of said engine by disabling the operation of at least some of the engine cylinders, and preventing further disabling of the cylinders if more than a predetermined force is exerted to the transmission control during the time when cylinders are being disabled for engine protection.

18. A method of operating a marine propulsion device as defined in claim 17, wherein fuel is continued to be supplied to the disabled cylinders by the fuel injectors during cylinder disabling.

19. A method of operating a marine propulsion system having a spark-ignited internal combustion engine, a fuel injector for supplying fuel to said engine for combustion therein, a propulsion device for propelling an associated watercraft, a change-speed transmission for transmitting drive at selected ratios from said engine to said propulsion device, a shift actuator for operator control of said change-speed transmission, means for sensing an abnormal engine condition, said method comprising the steps of controlling the timing of firing of the spark plug of said engine and the timing and duration of fuel injection by said fuel injector in response to an engine running condition, effecting a slowing of the engine in the event more than a predetermined force is exerted to effect said transmission control, effecting a slowing of the speed of said engine in response to the sensing of an abnormal engine condition, and precluding the effecting of slowing of the speed of the engine in response to the sensing of an abnormal engine condition and in the event more than predetermined force is exerted to the transmission control.

20. A method of operating a marine propulsion device as defined in claim 19, wherein the engine has a plurality of cylinders and fuel is continued to be supplied to the cylinders by the fuel injectors during the slowing of the engine speed.

21. A method of operating a marine propulsion device as defined in claim 19, further including the steps of sensing a demand for a rapid engine speed reduction and retarding the spark in response to the sensing of such a condition.

22. A method of operating a marine propulsion device as defined in claim 21, further including the step of continuing to supply fuel to the engine by the fuel injectors at the time when the spark is retarded during rapid slow-down.

* * * * *

UNITED STATES PATENT AND TRADEMARK OFFICE

CERTIFICATE OF CORRECTION

PATENT NO. : 5,827,150
DATED : October 27, 1998
INVENTOR(S) : Mukumoto

It is certified that error appears in the above-identified patent and that said Letters Patent is hereby corrected as shown below:

Column 20,
Line 46, please change "rapid slow-down" to -- rapid engine speed reduction --.
Line 56, please change "to the cylinders" to -- to the disabled cylinders --.

Signed and Sealed this

Twenty-sixth Day of November, 2002

*Attest:*

JAMES E. ROGAN

*Attesting Officer*

*Director of the United States Patent and Trademark Office*